US007065725B2

(12) United States Patent
Yajima et al.

(10) Patent No.: US 7,065,725 B2
(45) Date of Patent: Jun. 20, 2006

(54) SEMICONDUCTOR MANUFACTURING APPARATUS, MANAGEMENT APPARATUS THEREFOR, COMPONENT MANAGEMENT APPARATUS THEREFOR, AND SEMICONDUCTOR WAFER STORAGE VESSEL TRANSPORT APPARATUS

(75) Inventors: Hiromi Yajima, Kanagawa (JP); Tatsumi Suganuma, Kanagawa (JP); Noriaki Yoshikawa, Kanagawa (JP); Tadashi Yotsumoto, Oita (JP); Kenji Nakata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 371 days.

(21) Appl. No.: 10/377,770

(22) Filed: Mar. 4, 2003

(65) Prior Publication Data
US 2003/0171836 A1 Sep. 11, 2003

(30) Foreign Application Priority Data
Mar. 5, 2002 (JP) ............................. 2002-058489

(51) Int. Cl.
*G06F 17/50* (2006.01)
*G06F 19/00* (2006.01)
*G06F 11/30* (2006.01)

(52) U.S. Cl. ......................... 716/4; 700/108; 700/110; 702/183; 702/185

(58) Field of Classification Search ................ 716/4–5, 716/19–21; 438/14; 702/182, 183, 185; 700/108, 110, 121
See application file for complete search history.

(56) References Cited

U.S. PATENT DOCUMENTS 6,202,037 B1 * 3/2001 Hattori et al. ............... 702/182
2002/0059012 A1 * 5/2002 Ogawa et al. .............. 700/121

FOREIGN PATENT DOCUMENTS

| JP | 2-181299 | 7/1990 |
| JP | 2000-124094 | 4/2000 |
| JP | 2001-326150 | 11/2001 |
| JP | 2002-25877 | 1/2002 |

* cited by examiner

*Primary Examiner*—Paul Dinh
(74) *Attorney, Agent, or Firm*—Oblon, Spivak, McClelland, Maier & Neustadt, P.C.

(57) ABSTRACT

A semiconductor manufacturing apparatus having a plurality of portions according to this invention includes a storage device which stores, for each portion, information representing the lapsed time of use or the product processing count till occurrence of a failure after installation of the portion, and a calculation device which receives the information stored in the storage device and outputs function information representing a failure probability and/or failure rate as a function of the lapsed time of use or the product processing count for each portion.

5 Claims, 37 Drawing Sheets

12, 2, 219, 657, 772, 2545, 3221, 1268, 1100, 297, 2678, 2045, 1816, 523, 250, 721, 635, 5, 234, ················NUMBER OF DATA 290

LAPSED TIME OF USE TILL OCCURRENCE OF FAILURE AFTER INSTALLATION

FIG. 5

| NO | CLASS BOUNDARY | | CENTER VALUE OF CLASS | FREQUENCY | REMAINING COUNT | FAILURE PROBABILITY | FAILURE RATE (NUMBER OF FAILURES PER 1,000 H) |
|---|---|---|---|---|---|---|---|
| 1 | 0 | 250 | 125 | 43 | 290 | 0.148 | 0.593 |
| 2 | 250 | 500 | 375 | 25 | 247 | 0.101 | 0.405 |
| 3 | 500 | 750 | 625 | 28 | 222 | 0.126 | 0.505 |
| 4 | 750 | 1000 | 875 | 19 | 194 | 0.098 | 0.392 |
| 5 | 1000 | 1250 | 1125 | 11 | 175 | 0.063 | 0.251 |
| 6 | 1250 | 1500 | 1375 | 13 | 164 | 0.079 | 0.317 |
| 7 | 1500 | 1750 | 1625 | 20 | 151 | 0.132 | 0.530 |
| 8 | 1750 | 2000 | 1875 | 21 | 131 | 0.160 | 0.641 |
| 9 | 2000 | 2250 | 2125 | 12 | 110 | 0.109 | 0.436 |
| 10 | 2250 | 2500 | 2375 | 14 | 98 | 0.143 | 0.571 |
| 11 | 2500 | 2750 | 2625 | 16 | 84 | 0.190 | 0.762 |
| 12 | 2750 | 3000 | 2875 | 13 | 68 | 0.191 | 0.765 |
| 13 | 3000 | 3250 | 3125 | 14 | 55 | 0.255 | 1.018 |
| 14 | 3250 | 3500 | 3375 | 7 | 41 | 0.171 | 0.683 |
| 15 | 3500 | 3750 | 3625 | 3 | 34 | 0.088 | 0.353 |
| 16 | 3750 | 4000 | 3875 | 8 | 31 | 0.258 | 1.032 |
| 17 | 4000 | 4250 | 4125 | 7 | 23 | 0.304 | 1.217 |
| 18 | 4250 | 4500 | 4375 | 4 | 16 | 0.250 | 1.000 |
| 19 | 4500 | 4750 | 4625 | 4 | 12 | 0.333 | 1.333 |
| 20 | 4750 | 5000 | 4875 | 7 | 8 | 0.875 | 3.500 |
| 21 | 5000 | 5250 | 5125 | 1 | 1 | 1.000 | 4.000 |

APPARATUS: #1  
CURRENT DATE: 2001/08/01  
ARBITRARY INSPECTION POINT (DATE): 2001/08/30

| NO. | PORTION | COMPONENT | DELIVERY TIME (DATE) | INVENTORY AMOUNT | NECESSARY AMOUNT | ±P | ±D |
|---|---|---|---|---|---|---|---|
| 1 | A | — | 0 | 0.00 | 0.00 | 0.00 | 0 |
| 2 | A | a | 21 | 2.00 | 1.50 | +0.50 | +7 |
| 3 | A | b | 21 | 1.00 | 1.50 | -0.50 | -1 |
| 4 | A | c | 21 | 2.00 | 1.50 | +0.50 | +7 |
| 5 | B | — | 60 | 1.00 | 0.60 | +0.40 | +3 |
| 6 | C | — | 0 | 0.00 | 0.00 | 0.00 | 0 |
| 7 | C | a | 45 | 1.00 | 0.95 | +0.05 | +7 |
| 8 | C | b | 45 | 1.00 | 0.95 | +0.50 | +7 |
| 9 | D | — | 0 | 0.00 | 0.00 | 0.00 | 0 |
| 10 | D | a | 45 | 1.00 | 0.95 | +0.05 | +7 |
| 11 | D | b | 45 | 1.00 | 0.95 | +0.50 | +7 |
| 12 | E | — | 0 | 0.00 | 0.00 | 0.00 | 0 |
| 13 | E | a | 21 | 1.00 | 0.50 | +0.50 | +7 |
| 14 | E | b | 21 | 1.00 | 1.06 | -0.60 | -2 |
| 15 | E | c | 0 | 0.00 | 0.00 | 0.00 | 0 |

FIG. 28

APPARATUS : #1

CURRENT DATE : 2001/08/15
ARBITRARY INSPECTION POINT (DATE) : 2001/08/30
(PERIODIC INSPECTION DATE : AT 8 : 00 ON 30TH /MONTH )
INSPECTION (MONITORING) FREQUENCY:AT 8 : ○○ONCE / DAY )

| NO. | PORTION | COMPONENT | DELIVERY TIME (DATE) | INVENTORY AMOUNT | NECESSARY AMOUNT | ±P | ±D | ±PL | ±DL |
|---|---|---|---|---|---|---|---|---|---|
| 1 | A | - | 0 | 0.00 | 0 | 0.00 | 0 | ±0 | ±0 |
| 2 | A | a | 21 | 2.00 | 1.50 | +0.50 | +7 | ±0.5 | +7, -0 |
| 3 | A | b | 21 | 1.00 | 1.50 | -0.50 | -1 | ±0.5 | +7, -0 |
| 4 | A | c | 21 | 2.00 | 1.50 | +0.50 | +7 | ±0.5 | +7, -0 |
| 5 | B | - | 60 | 1.00 | 0.60 | +0.40 | +3 | ±0 | +7, -0 |
| 6 | C | - | 0 | 0.00 | 0 | 0.00 | 0 | ±0 | ±0 |
| 7 | C | a | 45 | 1.00 | 0.95 | +0.05 | +7 | ±0.5 | +7, -0 |
| 8 | C | b | 45 | 1.00 | 0.95 | +0.50 | +7 | ±0.5 | +7, -0 |
| 9 | D | - | 0 | 0.00 | 0 | 0.00 | 0 | ±0 | ±0 |
| 10 | D | a | 45 | 1.00 | 0.95 | +0.05 | +7 | ±0.5 | +7, -0 |
| 11 | D | b | 45 | 1.00 | 0.95 | +0.50 | +7 | ±0.5 | +7, -0 |
| 12 | E | - | 0 | 0.00 | 0 | 0.00 | 0 | ±0 | ±0 |
| 13 | E | a | 21 | 1.00 | 0.50 | +0.50 | +7 | ±0.5 | +7, -0 |
| 14 | E | b | 21 | 1.00 | 1.06 | -0.60 | -2 | ±0.5 | +7, -0 |
| 15 | E | c | 0 | 0.00 | 0.00 | 0.00 | 0 | ±0 | ±0 |

FIG. 29

APPARATUS : #1

CURRENT DATE:2001/08/15
ARBITRARY INSPECTION POINT (DATE):2001/08/30
(PERIODIC INSPECTION DATE : AT 8:00 ON 30TH /MONTH)
INSPECTION (MONITORING) FREQUENCY:AT 8 : OOONCE/DAY)

| NO. | PORTION | COMPONENT | DELIVERY TIME (DATE) | INVENTORY AMOUNT | NECESSARY AMOUNT | ±P | ±D | ±PL | ±DL |
|---|---|---|---|---|---|---|---|---|---|
| 14 | E | b | 21 | 1.00 | 1.06 | -0.60 | -2 | ±0.5 | +7, -0 |
| 3 | A | b | 21 | 1.00 | 1.50 | -0.50 | -1 | ±0.5 | +7, -0 |

FIG. 31

SEMICONDUCTOR MANUFACTURING APPARATUS, MANAGEMENT APPARATUS THEREFOR, COMPONENT MANAGEMENT APPARATUS THEREFOR, AND SEMICONDUCTOR WAFER STORAGE VESSEL TRANSPORT APPARATUS

CROSS REFERENCE TO RELATED APPLICATION

This application is based upon and claims benefit of priority under 35 USC 119 from the Japanese Patent Application No. 2002-58489, filed on Mar. 5, 2002, the entire contents of which are incorporated herein by reference.

BACKGROUND OF THE INVENTION

The present invention relates to a semiconductor manufacturing apparatus, management apparatus therefor, component management apparatus therefor, and semiconductor wafer storage vessel transport apparatus.

If a failure occurs in a semiconductor manufacturing apparatus and production cannot continue on a semiconductor device manufacturing line, the manufacture of a product during production by the apparatus stops, resulting in a product manufacturing delay or a long product manufacturing term. The generated failure is dealt with by specifying a portion within the apparatus as a failure cause and replacing the faulty portion with a new one.

To specify a faulty portion, a portion which has caused a failure is estimated, and the faulty operation reproducibility of the estimated portion is confirmed. However, faulty portion specifying work takes a long time. When there are a plurality of candidate portions as a failure cause, these candidate portions must be confirmed in an arbitrary confirmation order, or confirmation must be repeated by predetermined procedures in accordance with the manual or instruction manual, requiring a long time and much labor of the repairer.

To avoid this, it is effective to predict a failure and perform preventive maintenance as pre-replacement of a portion which is imminent to fail. To predict a failure at a portion, the faulty portion must be specified.

However, a conventional semiconductor manufacturing apparatus or a management apparatus which manages a plurality of semiconductor manufacturing apparatuses cannot specify any faulty portion or portion to be maintained.

An example of the semiconductor manufacturing apparatus is a semiconductor wafer storage vessel transport apparatus. This apparatus is used to supply a semiconductor wafer storage vessel which stores semiconductor wafers to a manufacturing apparatus or to recover the semiconductor wafer storage vessel from the manufacturing apparatus.

The semiconductor wafer storage vessel transport apparatus comprises one or more transport vehicles for transporting the semiconductor wafer storage vessel, and a controller for controlling the operation of the transport vehicles. If a transport vehicle fails and cannot continue transport, the apparatus transport ability decreases by this transport vehicle. Alternative manual transport requires the cost of the worker. If a plurality of transport vehicles fail, the influence becomes more serious. The faulty transport vehicles must be repaired to a normal transportable state as quick as possible.

A failure once generated is dealt with mainly by specifying a portion within the transport vehicle as a failure cause and replacing this portion with a new one. To specify a faulty portion, it is desirable to specify a faulty portion, confirm the faulty operation reproducibility of this portion, and confirm the reproducibility. If impossible, a series of test works such as confirmation of the operation of the overall apparatus must be executed after a specified portion is replaced.

Faulty portion specifying work takes a long time. When there are a plurality of candidate portions as a failure cause, these candidate portions must be confirmed in an arbitrary confirmation order, or confirmation must be repeated in a predetermined order in accordance with the instruction manual or the like, requiring a long time and much labor of the repairer.

The time taken to specify a faulty portion occupies most of the repair time. An increase in specifying time influences the transport stop time of the transport vehicle, degrading the transportability of the apparatus.

As described above, if a failure occurs in a semiconductor manufacturing apparatus and production cannot continue on a semiconductor device manufacturing line, the manufacture of a product during production by the apparatus stops, resulting in a product manufacturing delay or a long product manufacturing term. A failure in the apparatus during the manufacture of a product may make the product during processing defective.

In the presence of a plurality of manufacturing apparatuses capable of the same processing, the prior art cannot properly determine which of the manufacturing apparatuses is to be used to process a product, on the basis of the failure occurrence possibility of each manufacturing apparatus.

For this reason, a manufacturing apparatus which readily fails may be used in processing and fail during processing of a product, resulting in a defective product or prolonging the manufacturing term.

The prior art does not consider the failure probability of a manufacturing apparatus in maintenance for preventing any failure of a semiconductor manufacturing apparatus. Maintenance may be done even for a manufacturing apparatus with a low failure probability. To the contrary, no maintenance may be done even for many manufacturing apparatuses having high failure probabilities on the line, generating many failures at once.

Maintenances of a semiconductor manufacturing apparatus are classified into two: scheduled maintenance such as uniform periodic maintenance or predictive maintenance performed while monitoring the operation state of the apparatus; and post-failure maintenance performed every time a failure occurs.

To manage maintenance components used in post-failure maintenance, necessary components and necessary numbers of them are prepared in advance by the experience and skills of a person in charge.

In scheduled maintenance, components which should be prepared are obtained in accordance with maintenance contents, and can be prepared in advance to a certain degree. However, in advanced preparation for maintenance components upon occurrence of a sporadic failure, it is very difficult to predict a necessary component and its necessary amount.

To achieve successful inventory of maintenance components, even components which are rarely used must be excessively prepared, and many components become wasteful.

Management depending on the experience and skills of a person in charge may make a certain unexpected component unavailable due to limited personal skills, and the apparatus may have to be stopped for a long time until the component arrives.

A long-time stop of the apparatus on the manufacturing line leads to a long manufacturing term and a stop of production owing to the idle apparatus, posing a serious fault. To minimize the stop time of the apparatus, the apparatus must be immediately recovered even if it fails and stops. The repair skill is required even for an accidental failure, whereas it is also important to ensure a necessary amount of maintenance components, as needed.

However, it is conventionally very difficult to determine necessary components and their necessary amounts without the skills and experience of a person in charge, and manage maintenance components less in excessive inventory without making some component unavailable.

The prior art also suffers a problem about the maintenance time of the semiconductor manufacturing apparatus. Under the present circumstances, each portion of the semiconductor manufacturing apparatus is maintained periodically or upon occurrence of a failure, as described above. In periodic maintenance, a portion which hardly fails may be maintained to redundantly stop the apparatus. To the contrary, it is too late to maintain the apparatus after a failure occurs and a defective product is manufactured.

It is conventionally difficult to set a proper maintenance time which reflects the failure probability of each portion within the apparatus.

As described above, it is conventionally difficult to specify a faulty portion or a portion to be maintained upon occurrence of a failure in the semiconductor manufacturing apparatus.

For example, an apparatus for transporting a vessel which stores semiconductor wafers, as the semiconductor manufacturing apparatus, cannot properly specify a faulty portion.

In the presence of a plurality of semiconductor manufacturing apparatuses capable of the same processing, the prior art cannot properly determine which of the apparatuses is to be used. An apparatus which readily fails may be chosen for the processing, and the cost may increase owing to a defective product or a long manufacturing term.

The prior art suffers maintenance problems. (1) Excessive components are wastefully stocked due to excessive inventory of maintenance components. (2) If an unexpected failure occurs, maintenance components cannot be obtained due to insufficient management of maintenance components or the lack of skills of the worker, and the apparatus stops for a long time with a loss. (3) The difficulty of managing maintenance components requires many persons in charge and many works.

Also, it is conventionally difficult to set a proper time for maintenance of the semiconductor manufacturing apparatus.

SUMMARY OF THE INVENTION

According to one aspect of the present invention, a semiconductor manufacturing apparatus having a plurality of portions comprises a storage device which stores, for each portion, information representing a lapsed time of use or a product processing count till occurrence of a failure after installation of the portion, and a calculation device which receives the information stored in the storage device and outputs function information representing a failure probability and/or a failure rate as a function of the lapsed time of use or the product processing count for each portion.

According to one aspect of the present invention, a management apparatus which manages a semiconductor manufacturing apparatus comprises a storage device which stores, for each portion in the semiconductor manufacturing apparatus, information representing a lapsed time of use or a product processing count till occurrence of a failure after installation of the portion, and a calculation device which receives the information stored in the storage device and outputs function information representing a failure probability and/or a failure rate as a function of the lapsed time of use or the product processing count for each portion.

According to one aspect of the present invention, a semiconductor wafer storage vessel transport apparatus having a transport vehicle which transports a semiconductor wafer storage vessel and a control device which controls operation of the transport vehicle comprises a storage device which stores, for each of portions in the transport vehicle and the control device, information representing a lapsed time of use till occurrence of a failure after start of use, a transport count, or a moving distance, and a calculation device which receives the information stored in the storage device, and outputs function information representing a failure probability and/or a failure rate as a function of the lapsed time of use, the transport count, or the moving distance for each portion.

According to one aspect of the present invention, a management apparatus which manages a plurality of semiconductor manufacturing apparatuses each having a plurality of portions comprises a storage device which stores, for each portion in each semiconductor manufacturing apparatus, information representing a lapsed time of use or a product processing count till occurrence of a failure after installation of the portion, a calculation device which receives the information stored in the storage device, obtains function information representing a failure probability and/or a failure rate as a function of the lapsed time of use or the product processing count for each portion, and outputs the function information, and an assigning unit which collects pieces of information representing failure probabilities and/or failure rates of the respective semiconductor manufacturing apparatuses on the basis of the function information, sequentially arranges the plurality of management apparatuses in ascending order of failure probability and/or failure rate, and outputs the failure probabilities and/or failure rates.

According to one aspect of the present invention, an apparatus which maintains and manages a component of a semiconductor manufacturing apparatus comprises a storage device which stores, for each component, information representing a lapsed time of use or a product processing count till occurrence of a failure after installation of the portion, and a calculation device which receives the information stored in the storage device to generate first function information representing a failure probability and/or a failure rate as a function of the lapsed time of use or the product processing count for each component, obtains a failure probability and/or a failure rate as a function of an arbitrary lapsed time of use or an arbitrary product processing count for each component by using the first function information to generate second function information representing a sum of values of the failure probability and/or the failure rate as a function of the lapsed time of use or the product processing count for each component, and obtains a necessary preparation amount of maintenance components at an arbitrary lapsed time of use or an arbitrary product processing count for each component by using the second function information.

According to one aspect of the present invention, a semiconductor manufacturing apparatus or a management apparatus which manages at least one semiconductor manufacturing apparatus comprises a storage device which stores, for each portion, information representing a lapsed time of use or a product processing count till occurrence of a failure after installation of the portion, and a calculation device which receives the information stored in the storage device, obtains a failure probability and/or a failure rate as a function of the lapsed time of use or the product processing count for each portion, and determines, as a maintenance execution time of the portion, a time at which the failure probability and/or the failure rate reaches a specific value set for the portion.

BRIEF DESCRIPTION OF THE DRAWINGS

FIG. 5 is a table showing data used in the histogram shown in FIG. 4B and calculation results;

FIGS. 11A to 11D are graphs with respect to the histogram of FIG. 4, in which FIG. 11A shows a comparison with a straight line in application of a standard normal distribution obtained by plotting the lapsed time of use along the abscissa and the failure probability along the ordinate on a scale transformed to a straight line in application of the standard normal distribution, FIG. 11B shows a comparison with a straight line in a standard lognormal distribution obtained by plotting the lapsed time of use along the logarithmic axis of the abscissa and the failure probability along the ordinate, and logarithmically transforming the lapsed time of use, FIG. 11C shows a comparison with a straight line in a standard exponential distribution obtained by plotting the lapsed time of use along the abscissa and the failure probability along the ordinate on an exponentially transformed scale, and FIG. 11D shows a comparison with a straight line in application of a Weibull distribution obtained by plotting the lapsed time of use along the logarithmic axis of the abscissa and the cumulative failure rate having undergone double logarithmic processing along the ordinate;

FIG. 28 is a table showing example 1 of maintenance component management information data;

FIG. 29 is a table showing example 2 of maintenance component management information data obtained according to the seventh embodiment of the present invention;

FIG. 31 is a table showing example 3 of maintenance component management information data;

DESCRIPTION OF THE PREFERRED EMBODIMENTS

Preferred embodiments of the present invention will be described below with reference to the accompanying drawings.

(1) First Embodiment

Figure 1:
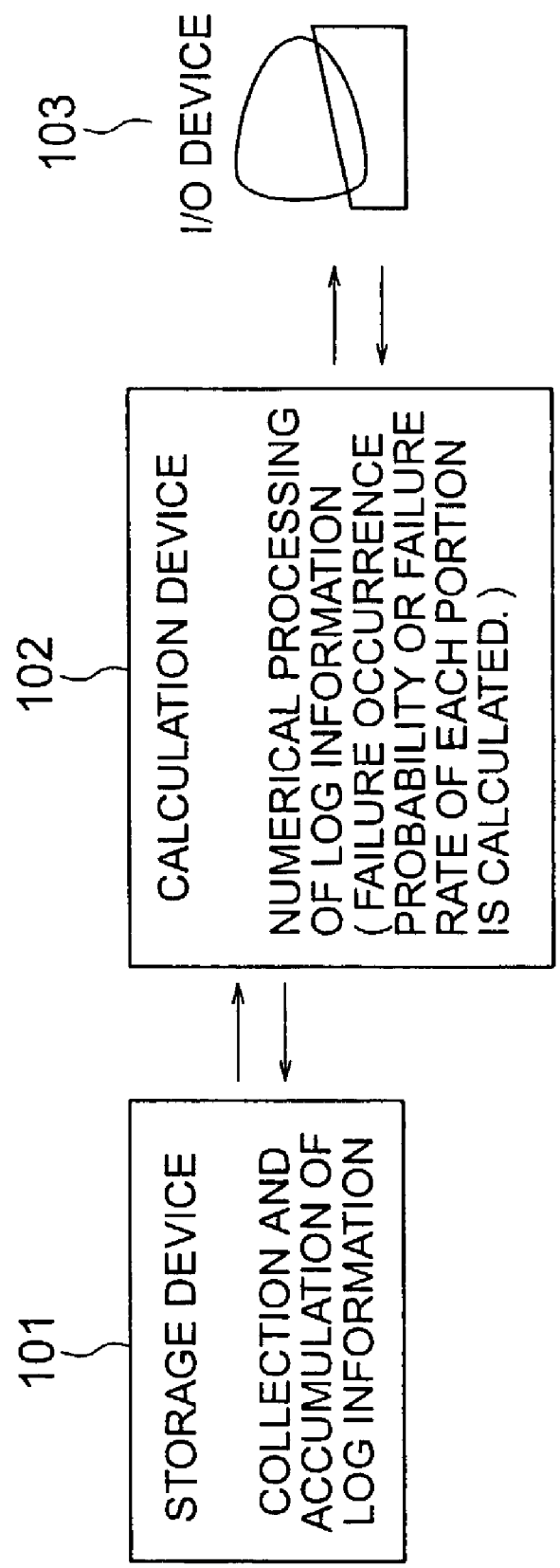
FIG. 1 is a block diagram showing the arrangement of a management apparatus which is arranged inside or outside a semiconductor manufacturing apparatus according to the first embodiment of the present invention and performs management regarding the failure of a component.

FIG. 1 shows the arrangement of a management apparatus regarding occurrence of a failure that is incorporated in a semiconductor manufacturing apparatus according to the first embodiment of the present invention, or the arrangement of a management apparatus for managing a failure generated in a semiconductor manufacturing apparatus which does not incorporate any management apparatus. This management apparatus comprises a storage device 101, calculation device 102, and I/O device 103.

Log information (to be described later) input from the I/O device 103 is supplied to the storage device 101 and accumulated in it.

The log information is supplied to the calculation device 102 and calculated. The result is stored in the storage device 101 and output from the I/O device 103.

The processing contents of the management apparatus will be explained with reference to FIGS. 2 and 3.

Figure 2:
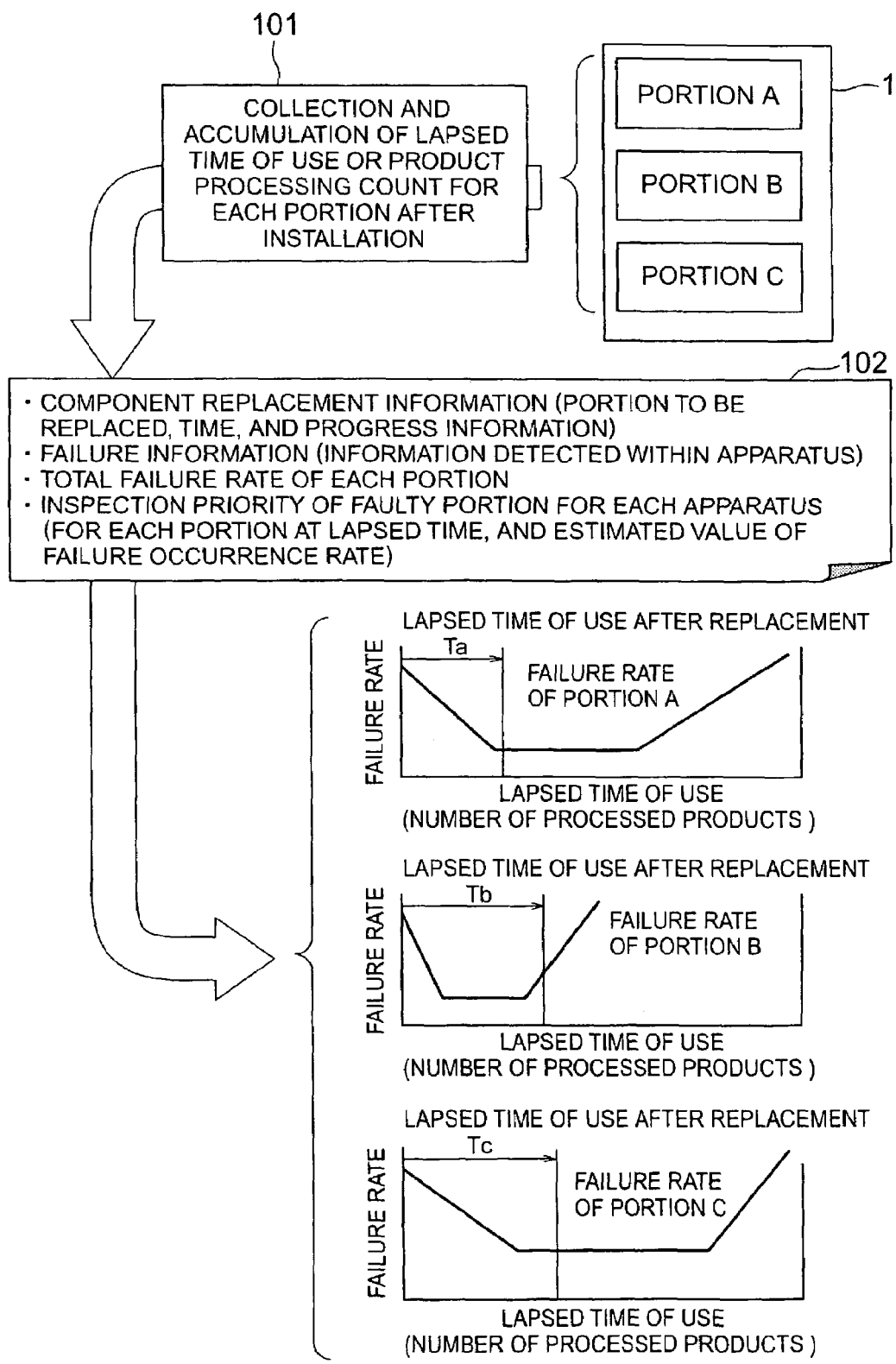
FIG. 2 is a graph showing the failure rate of each portion obtained according to the first embodiment as a function of the lapsed time of use.

As shown in FIG. 2, the lapsed time of use after installation or the number of processed products is set as a log for each of portions A, B, and C serving as replacement units within a semiconductor manufacturing apparatus 1. Logs are collected and accumulated in the storage device 101 via the I/O device 103. The calculation device 102 numerically processes the collected/accumulated data for each portion as a unit, calculates the failure probability and/or failure rate of each portion in the installed apparatus during operation, and outputs function information which can be changed into graph information representing the failure probability and/or failure rate. This function information is graphed for portions A, B, and C with the abscissa representing the lapsed time of use after installation or the number of processed products, and the ordinate representing the failure probability or failure rate, as shown in FIG. 2.

The use of graph information allows obtaining the failure probability and/or failure rate as a function of an arbitrary lapsed time Ta of use after replacement or the number of processed products. This facilitates determining whether to maintain the respective portions.

Figures 3A, 3B:
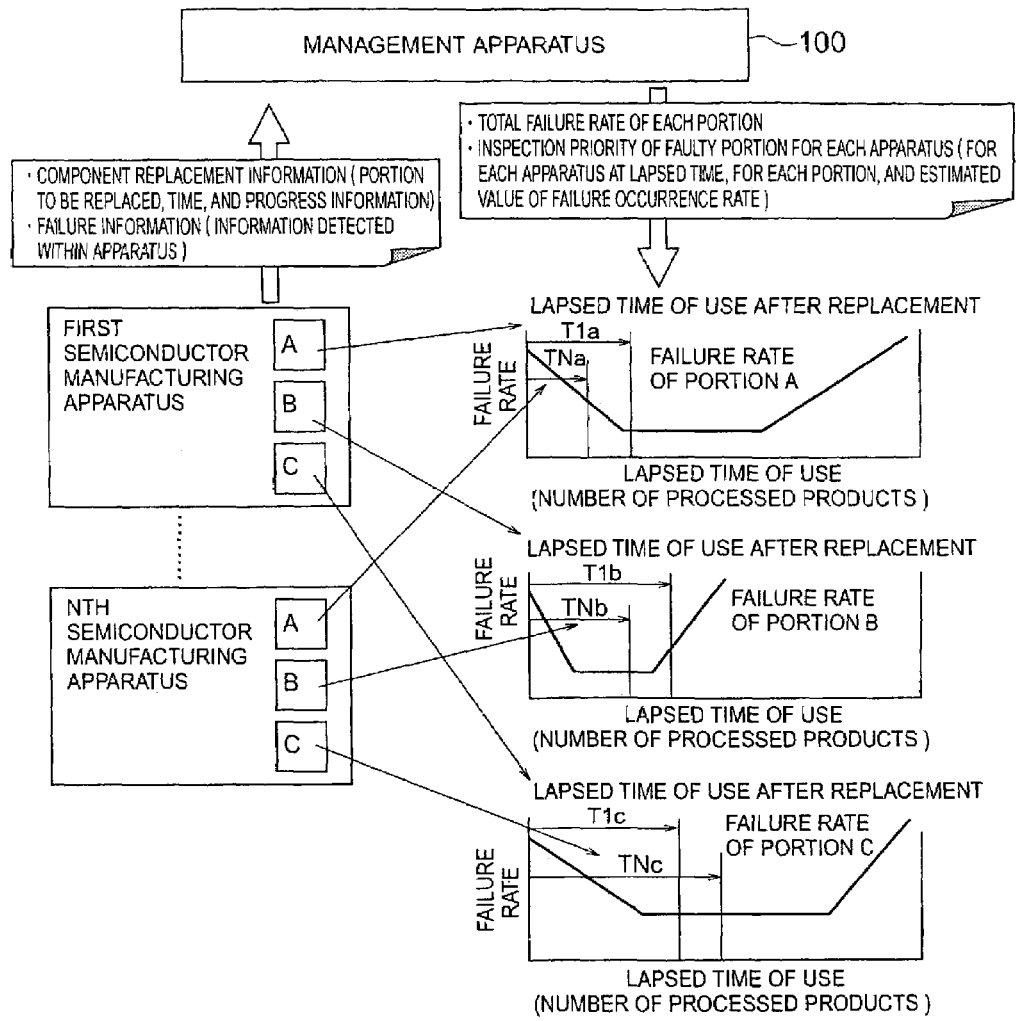
FIG. 3A is a graph showing the failure rate of each portion obtained according to the first embodiment as a function of information on the lapsed time of use in a plurality of semiconductor manufacturing apparatuses.
FIG. 3B is a table showing the failure occurrence probability of each portion.

A case wherein management of failures generated in a plurality of semiconductor manufacturing apparatuses is done using the management apparatus will be explained. As shown in FIG. 3A, the failure probabilities and/or failure rates of a plurality of semiconductor manufacturing apparatuses (first apparatus, second apparatus, . . . , Nth apparatus) having identical portions A, B, and C are obtained.

Information on the lapsed time of use or the number of processed products is input to a management apparatus 100 for each of portions A, B, and C in each semiconductor manufacturing apparatus. The management apparatus 100 performs numerical processing by using collected log information of each of portions A, B, and C, calculates the failure probability or failure rate of each portion, and outputs it as graph information of each portion.

When a given apparatus fails, failure probabilities $\lambda A$, $\lambda B$, and $\lambda C$ are specified in accordance with the failure probability curves of portions A, B, and C in the apparatus.

As shown in FIG. 3B, the specified failure probabilities of portions A, B, and C are displayed on the display device of the I/O device 103 in an order of B, C, and A determined in descending order of occurrence probability.

The obtained graph information can be shared between a plurality of apparatuses for each portion. In maintenance for identical portions in the respective apparatuses, the number of portions to be prepared can be calculated.

Once a failure occurs, the failure probability or failure rate at that time can be specified for each portion. Upon a failure in a given apparatus, a faulty portion must be specified. Failure inspection can start from a portion having the highest failure occurrence probability. Repetitive inspection work for each portion can be reduced, and the inspection time can be shortened. As a result, the repair time can be shortened, contributing to higher apparatus productivity.

A failure probability/failure rate numerical processing method and graph information method will be described.

Figures 4A, 4B:
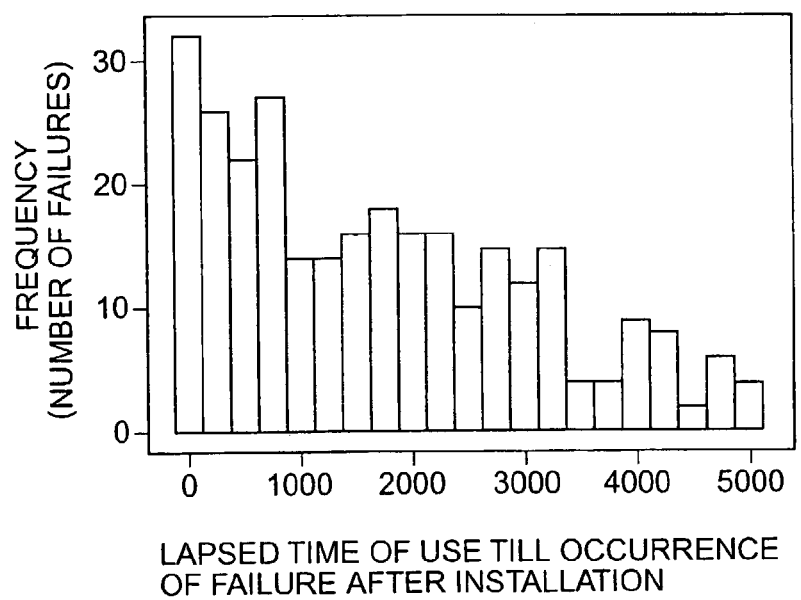
FIG. 4A is a view showing data representing the lapsed time of use till occurrence of a failure for each portion.
FIG. 4B is a histogram showing the frequency distribution of the failure occurrence count by using the data as a function of the lapsed time of use till occurrence of a failure.

Assume that information on the lapsed times of use from installation to a failure at identical portions is acquired, as shown in FIG. 4A. Values "12, 2, 219, 657, . . . " shown in FIG. 4A represent the lapsed times of use until respective portions fail. The lapsed use time information is divided by the square root of the number of data of the lapsed use time information (290 data for information shown in FIG. 4A), the sum of the square root of the number of data and 1, or the number of classes close to this value. The pieces of lapsed use time information are plotted along the abscissa, and the number of failures generated in each class, i.e., the frequency is plotted along the ordinate, obtaining a histogram as shown in FIG. 4B.

FIG. 5 shows an example of the frequency (number of failures) in each class in creating such a histogram. The class corresponds to the time interval till occurrence of a failure. The remaining count corresponds to the number of portions free from any failure before a target class.

The failure probability and failure rate in each class can be calculated by

Failure Probability in Each Class=Frequency in Each Class/Remaining Count in Each Class (1)

Failure Rate in Each Class=Frequency in Each Class/Remaining Count in Each Class*Class Width (Time Interval) (2)

The failure rate corresponds to an average failure probability as a function of the lapsed time of use in each class. As represented by equation (2), the failure rate is the quotient obtained upon dividing the failure probability by a time interval corresponding to the width of the class.

Figure 6:
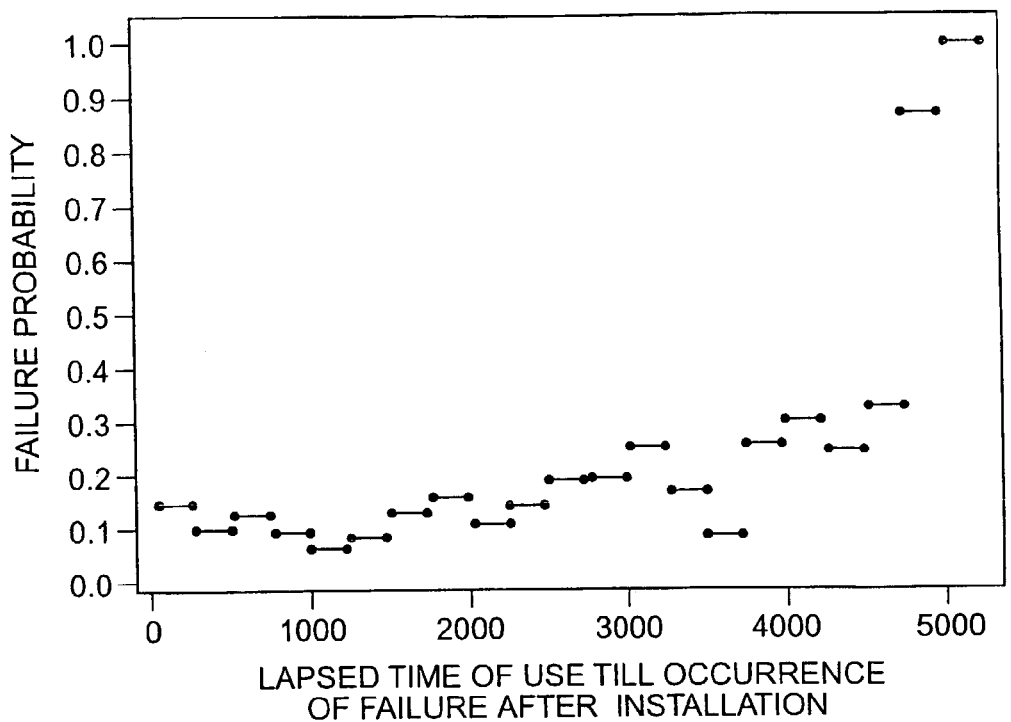
FIG. 6 is a graph showing the failure probability shown in FIG. 5 that is plotted every time interval of the lapsed time of use.
Figure 7:
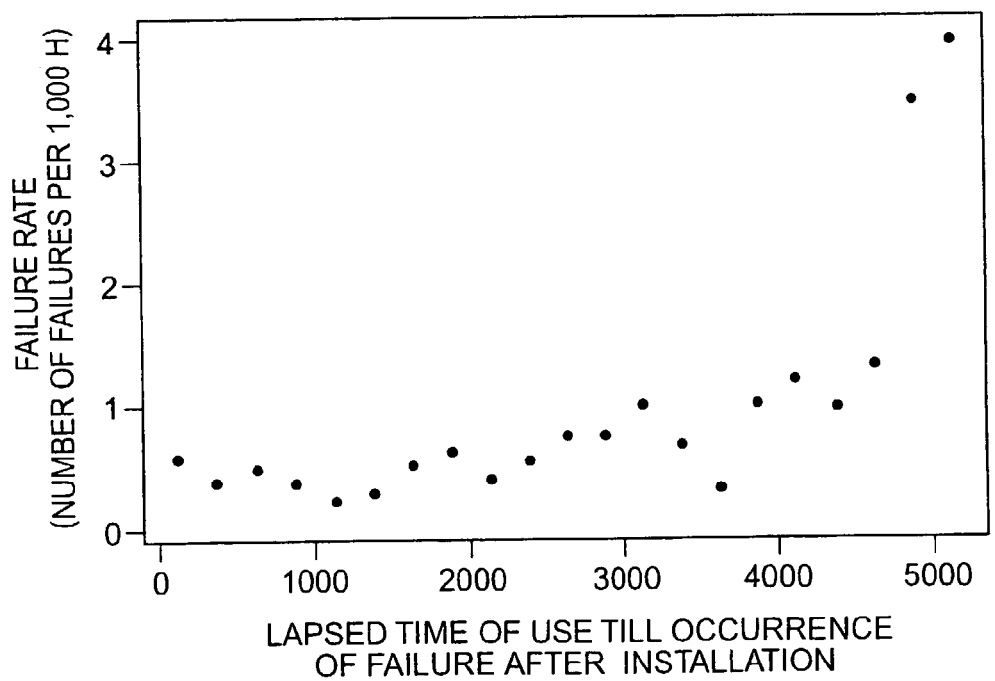
FIG. 7 is a graph showing the failure rate per 1,000 h shown in FIG. 5 that is plotted at the center value of each time interval.

FIG. 6 shows an example of a graph obtained by plotting the failure probability as a function of the lapsed time of use in each class. FIG. 7 shows an example of a graph obtained by plotting the failure rate.

Figure 8:
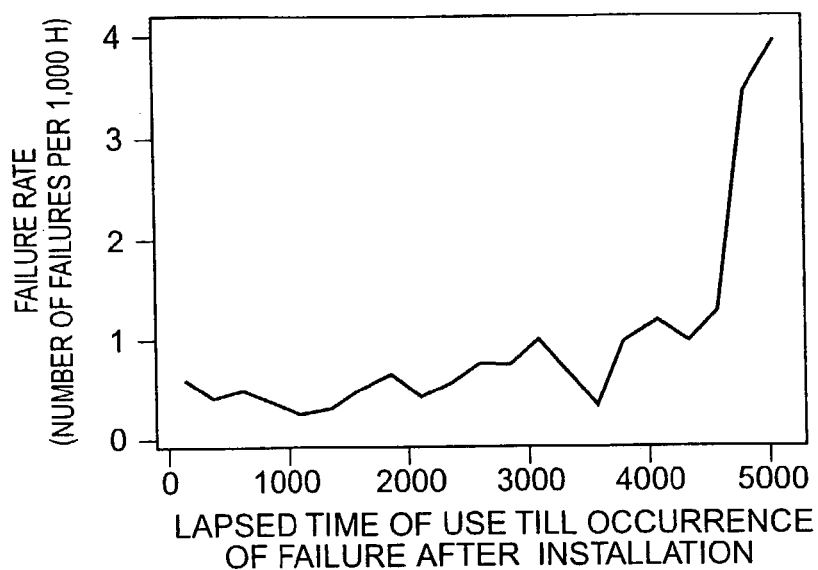
FIG. 8 is a graph showing the failure rate obtained by connecting plot points in the graph of FIG. 6 with straight lines, as a function of an arbitrary lapsed time of use on each straight line.
Figure 9:
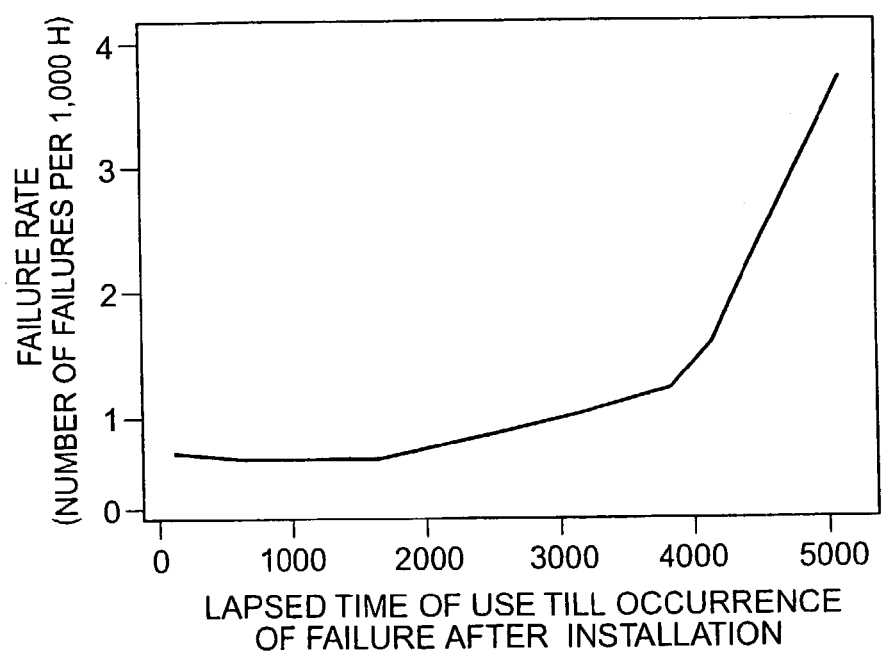
FIG. 9 is a graph showing the failure rate obtained by grouping plot points in the graph of FIG. 7 and connecting the groups by the least-squares method, as a function of an arbitrary lapsed time of use on each straight line.

A graph obtained by connecting points in FIG. 6 or 7 with a curve or straight lines is created, which provides the estimated value of a failure probability or failure rate at an arbitrary lapsed time of use. FIG. 8 shows a graph obtained by connecting points of the failure rate by straight lines. FIG. 9 shows a graph obtained by drawing with a curve a quadratic curve function applied to an interval group by using the least-squares method.

The above-described embodiment attains the following operations and effects.

1) Failure inspection can start from a portion having the highest failure occurrence probability. Repetitive inspection work for each portion can be reduced, and the inspection time can be shortened. The repair time can be shortened, contributing to higher apparatus productivity and a shorter production term. For the same reason, a short repair time can decrease the number of repair steps, realizing labor saving.

2) A preventive maintenance index for practicing portion replacement work can be obtained before occurrence of a failure, preventing occurrence of a failure.

(2) Second Embodiment

In the second embodiment of the present invention, the failure probability and/or failure rate is obtained for each portion, similar to the first embodiment. Further, a statistical distribution model is created using histogram information shown in FIG. 4 or information on the number of generated failures as a function of the lapsed time of use, and the estimated value of a failure probability or failure rate as a function of an arbitrary lapsed time of use is calculated.

Figure 10:
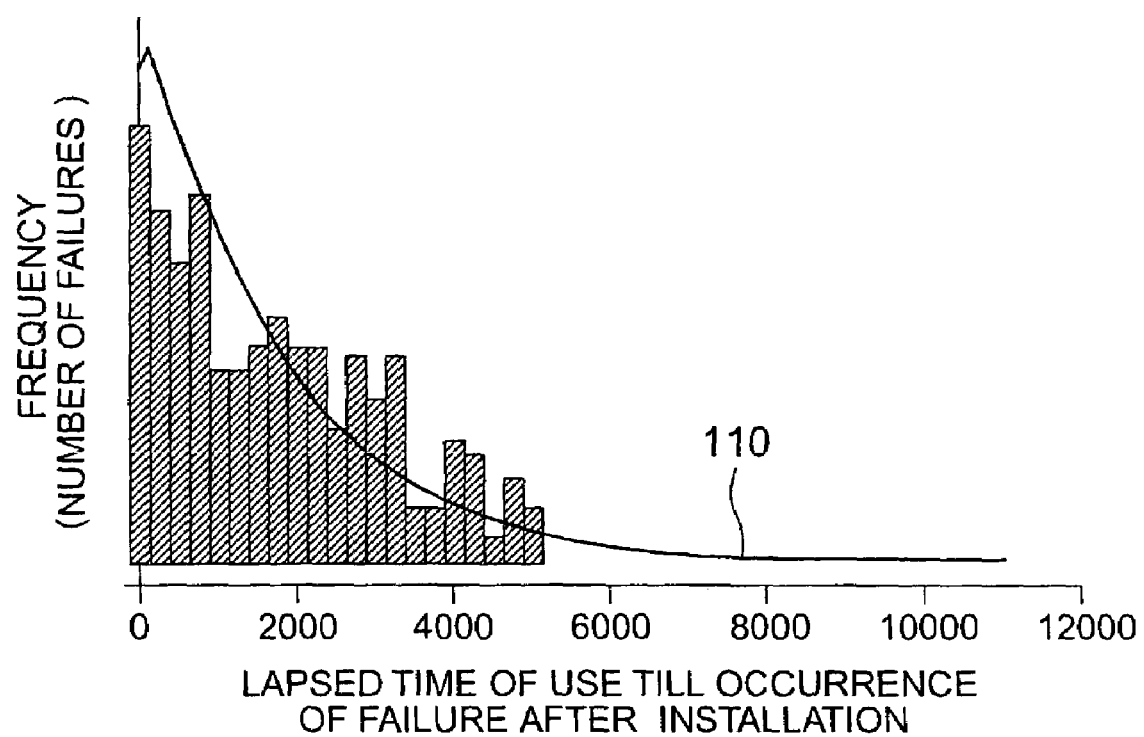
FIG. 10 is a histogram to which the probability density function of the Weibull distribution of the histogram in FIG. 4 is applied according to the second embodiment of the present invention.
Figure 11A:
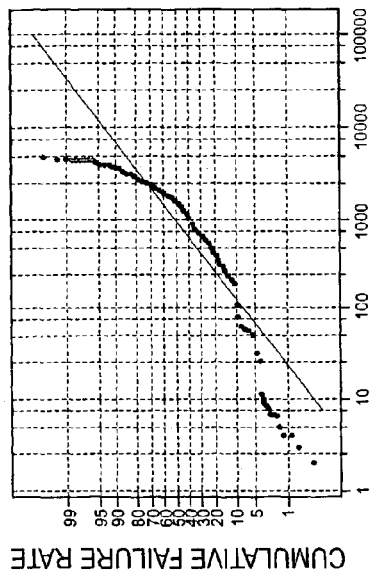
Figure 11B:
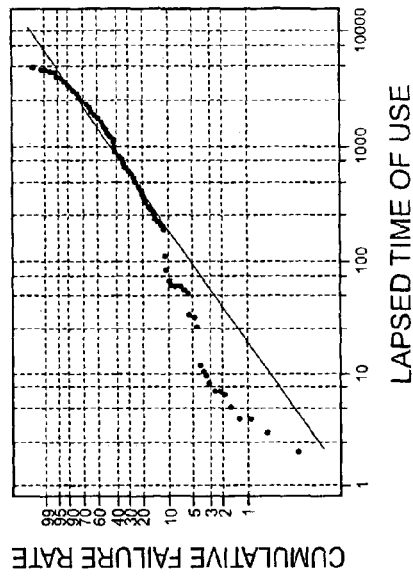
Figure 11C:
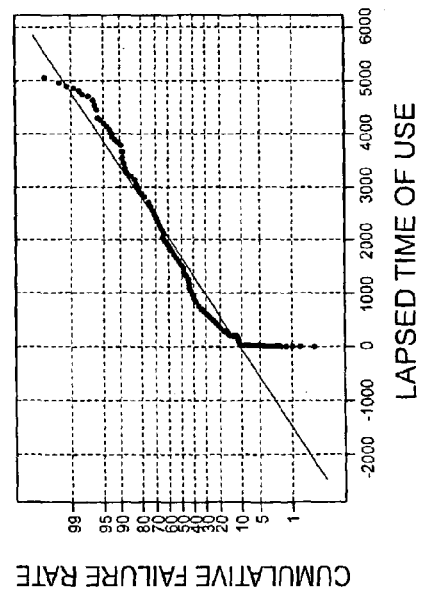
Figure 11D:
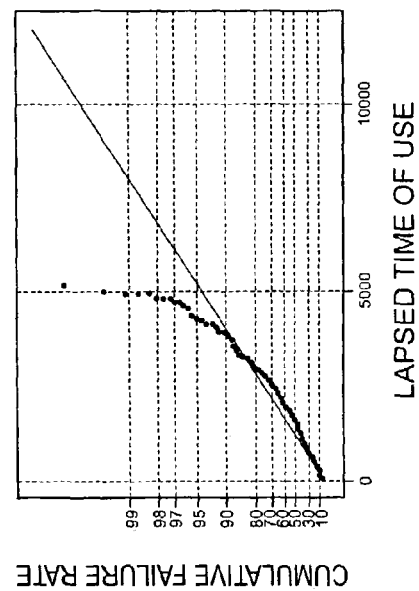

FIG. 10 shows an example of applying a Weibull distribution to the histogram in FIG. 4. In FIG. 10, a curve 110 is the line of the Weibull distribution.

The distribution model applicable to the second embodiment is not limited to the Weibull distribution, and can be a normal distribution, exponential distribution, lognormal distribution, or the like. The applicability of each distribution is desirably taken into consideration.

FIGS. 11A, 11B, 11C, and 11D show examples of graphs in application of the normal distribution, lognormal distribution, exponential distribution, and Weibull distribution. A cumulative failure rate representing the ratio of the cumulative number of failures to the total number of portions is plotted along the Y-axis as a function of the lapsed time of use along the X-axis such that each distribution model is given by a straight line. The cumulative failure rate is deformed by logarithmic processing or double logarithmic processing. As the lapsed time of use increases, the value of the cumulative failure rate along the Y-axis comes close to 100% as the cumulative value of the failure count.

From a comparison between FIGS. 11A to 11D, the applicability of the exponential distribution model is high on the initial stage of the lapsed time of use, and that of the Weibull distribution model is high on the latter stage. A distribution model with higher applicability is adopted on each stage, and equation information for the lapsed time of use can be obtained from the resultant straight line.

Figure 12:
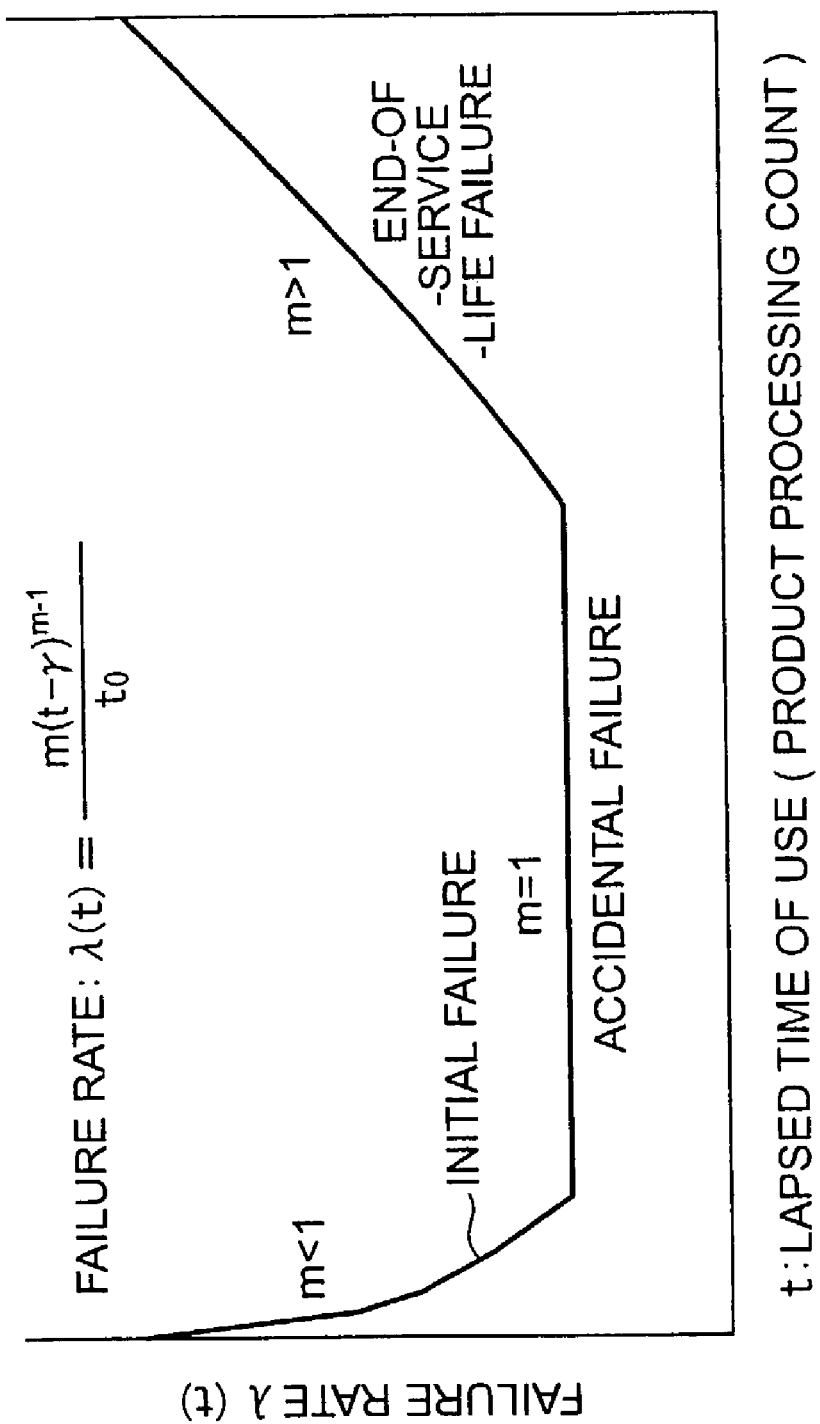
FIG. 12 is graph showing the failure rate as a function of the lapsed time of use in application of a Weibull model.

FIG. 12 shows an example of a graph representing the failure rate as a function of the lapsed time of use in application of the Weibull distribution. The failure rate is given by $$\lambda(t) = m(t-\gamma)^{m-1}/t_0 \qquad (3)$$

where m is a shape parameter, ã is a position parameter for assigning respective stages such as an initial failure stage, accidental failure stage, and end-of-service-life failure stage, and $t_0$ is a parameter for setting the length along the abscissa (lapsed time of use or the number of processed products).

On the initial failure stage (m<1), many initial failures occur. On the accidental failure stage (m=1), almost all initial failures have occurred, and a failure accidentally occurs before the end of the service life. On the end-of-service-life failure stage, a failure occurs owing to the end of service life.

This failure probability curve depends on the material and structure of each portion, and is unique to the design and manufacture of the portion. With the same design and same manufacture, the failure occurrence probability is uniformly estimated depending on the curve.

According to the above-described embodiment, lapsed information till a failure is accumulated and subjected to numerical processing for each portion within an apparatus, calculating a failure probability and/or failure rate at each portion. Graph information which allows obtaining a failure probability and/or failure rate at an arbitrary time or an arbitrary number of processed products can be provided. Failure cause inspection, preventive maintenance, and inventory management of a portion can be supported.

Similarly in a plurality of apparatuses, lapsed information till a failure is accumulated and subjected to numerical processing for each portion within each apparatus, calculating the failure probability or failure rate at each apparatus portion. Preventive maintenance and inventory management of a portion can be supported.

(3) Third Embodiment

A semiconductor wafer storage vessel transport apparatus according to the third embodiment of the present invention will be described with reference to FIGS. 13A to 16B.

Figure 13A:
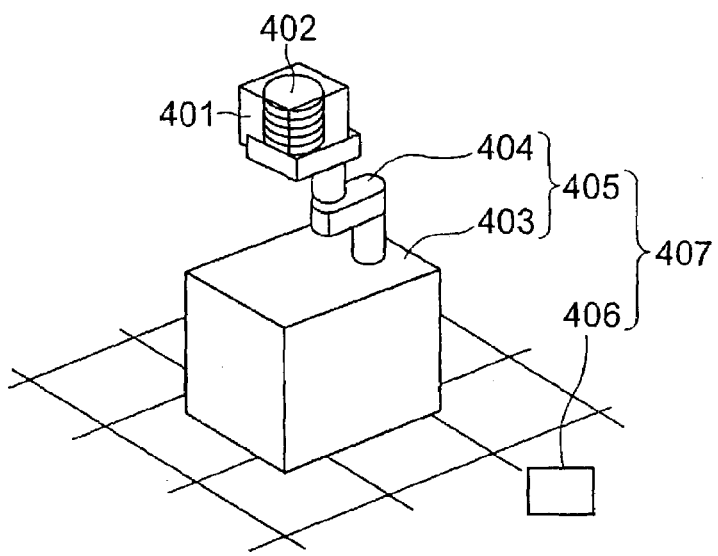
FIG. 13A is a perspective view showing the outer appearance of example 1 of a semiconductor wafer storage vessel transport apparatus according to the third embodiment of the present invention.
Figure 13B:
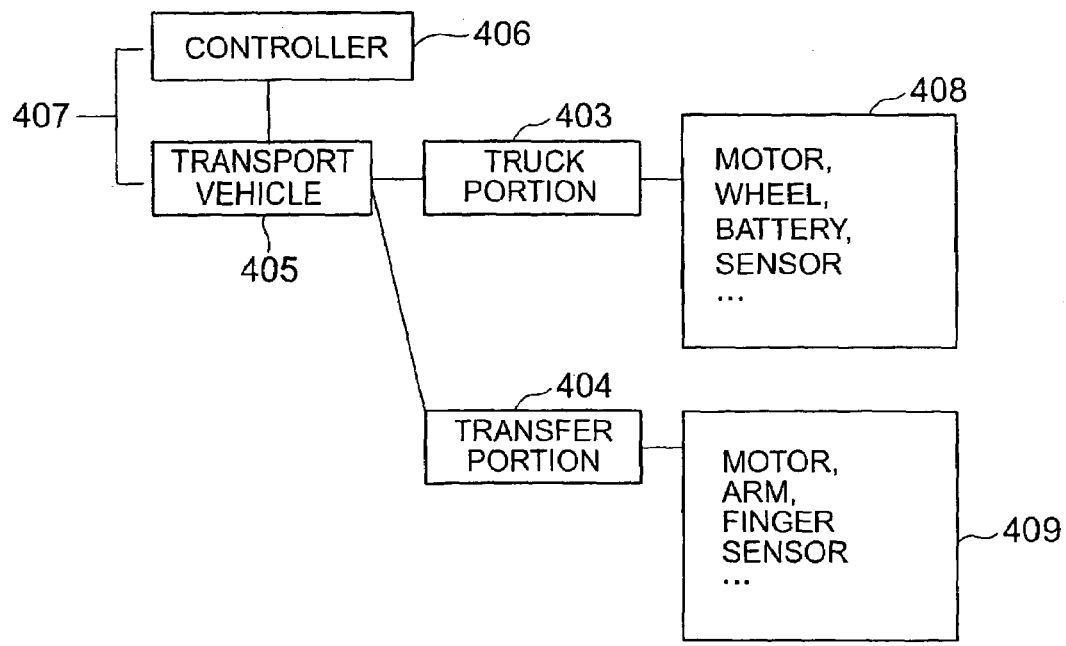
FIG. 13B is a block diagram showing the arrangement of example 1.

An example of the semiconductor wafer storage vessel transport apparatus according to the third embodiment has an outer arrangement shown in FIG. 13A, and a block arrangement shown in FIG. 13B.

A transport apparatus 407 comprises a transport vehicle 405 having a truck portion 403 including a motor/wheel/battery 408 and a transfer portion 404 including a motor/arm/finger 409, and a controller 406 which controls the operation of the transport vehicle 405.

Figure 14A:
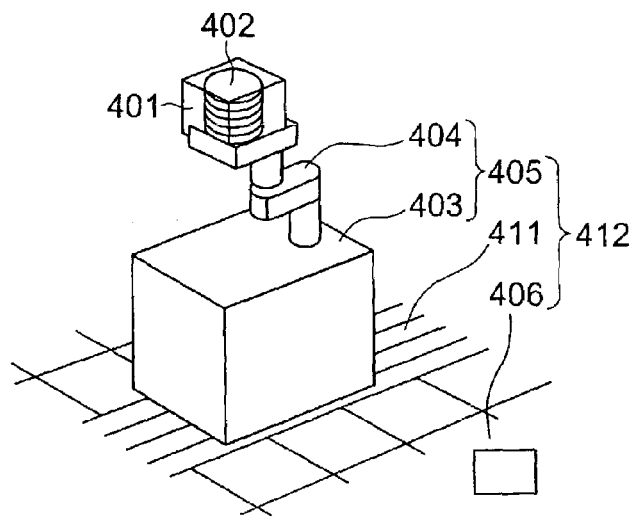
FIG. 14A is a perspective view showing the outer appearance of example 2 of the semiconductor wafer storage vessel transport apparatus according to the third embodiment.
Figure 14B:
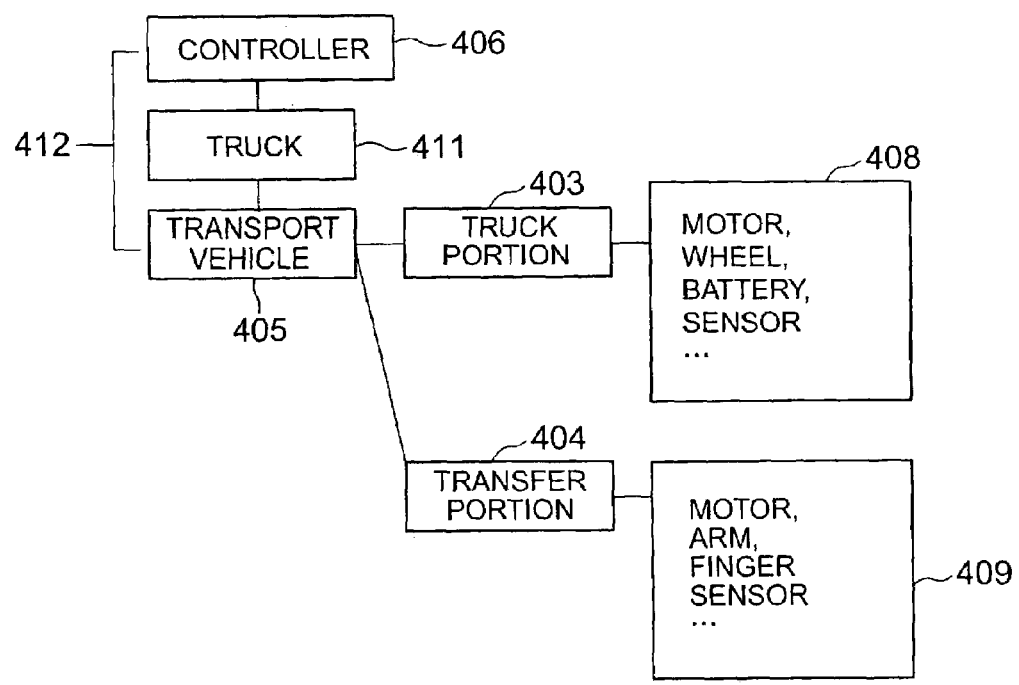
FIG. 14B is a block diagram showing the arrangement of example 2.

FIGS. 14A and 14B show another example of the transport apparatus. Unlike the apparatus shown in FIGS. 13A and 13B, the transport vehicle 405 travels on a track 411.

Figure 15A:
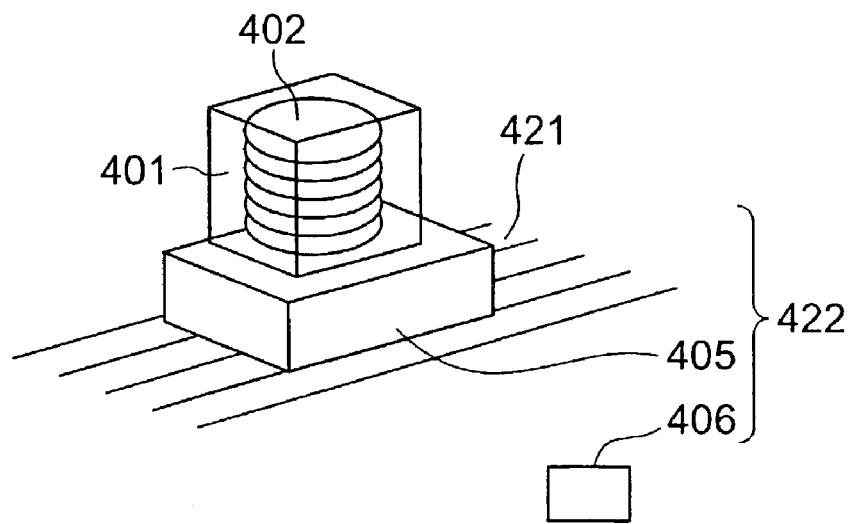
FIG. 15A is a perspective view showing the outer appearance of example 3 of the semiconductor wafer storage vessel transport apparatus according to the third embodiment.
Figure 15B:
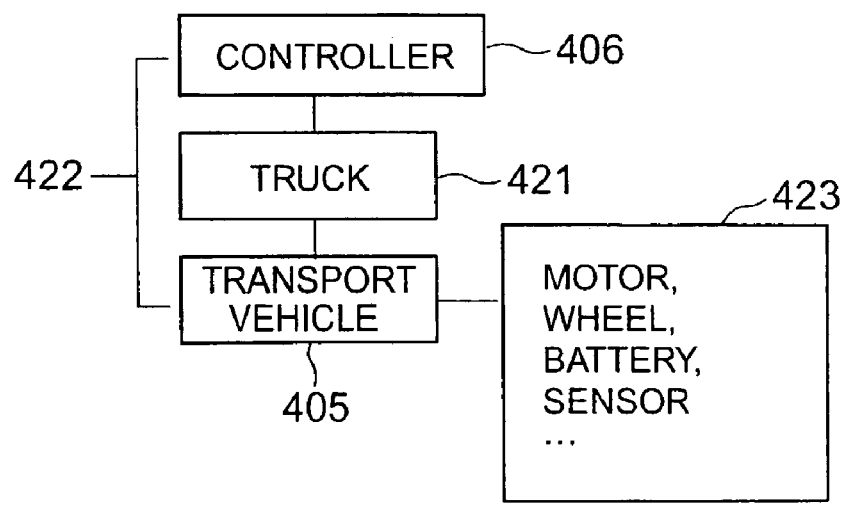
FIG. 15B is a block diagram showing the arrangement of example 3.

FIGS. 15A and 15B show still another example of the transport apparatus. The transport vehicle 405 travels on a track 421, similar to the apparatus shown in FIGS. 14A and 14B, but includes a portion corresponding to a truck portion.

Figure 16A:
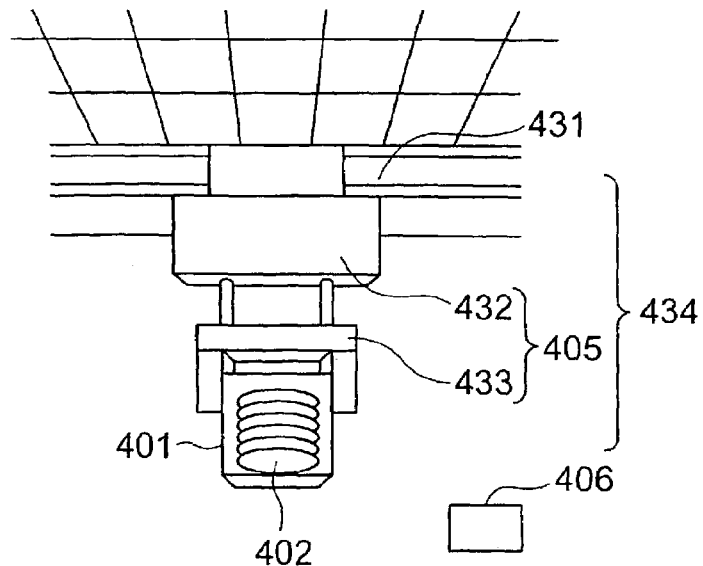
FIG. 16A is a perspective view showing the outer appearance of example 4 of the semiconductor wafer storage vessel transport apparatus according to the third embodiment.
Figure 16B:
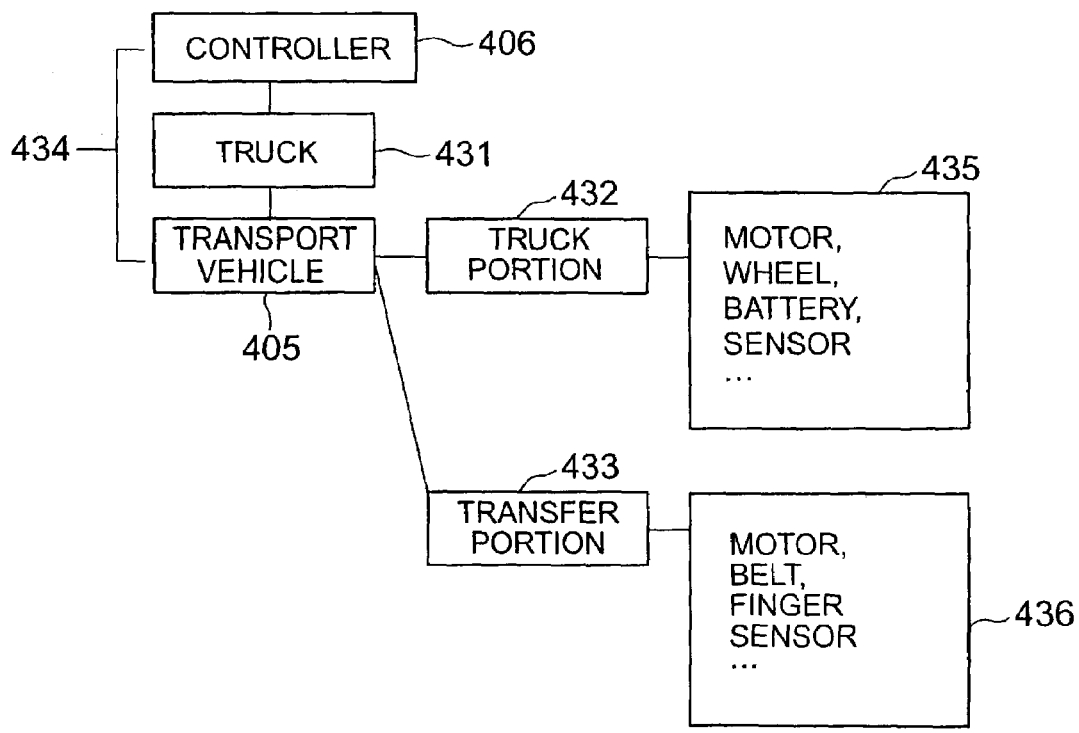
FIG. 16B is a block diagram showing the arrangement of example 4.

In still another example of the transport vehicle 405 shown in FIGS. 16A and 16B, a track 431 is formed on the ceiling, and a transfer portion 433 which supports a truck portion 432 travels under the control of the controller 406.

Elements such as a motor, wheel, battery, and sensor which constitute the transport vehicle are considered as examples of portions A, B, and C in the transport apparatus.

The present invention can also be applied to the semiconductor wafer storage vessel transport apparatus, similar to the semiconductor manufacturing apparatus in the first embodiment. The semiconductor wafer storage vessel transport apparatus can be managed by calculating a failure probability or failure rate. The transport apparatus may comprise the management apparatus as shown in FIG. 1, or the management apparatus may be arranged separately from the transport apparatus.

Examples of information representing a transport log are the lapsed time of use after installation, the moving distance, and the transport count.

In the presence of a plurality of transport vehicles, the failure log is individually recorded for each portion in accordance with the transport log such as the lapsed time of use after installation or the moving distance.

More specifically, occurrence probabilities $\lambda A$, $\lambda B$, and $\lambda C$ on the failure probability curve are specified by the transfer logs of portions A, B, and C such as lapsed times of use or traveling distances. The order of portions is determined in descending order of specified failure probability or occurrence probability of portions A, B, and C. Failure inspection can start from a portion having the highest failure occurrence probability, repetitive inspection work for each portion can be reduced, and the time taken to inspect a failure cause can be shortened. Hence, the repair time can be shortened, preventing degradation in the transportability of the apparatus upon occurrence of a failure.

(4) Fourth Embodiment

A semiconductor production system having a management apparatus which manages a plurality of semiconductor manufacturing apparatuses according to the fourth embodiment of the present invention will be explained with reference to FIG. 17.

The fourth embodiment adopts a semiconductor manufacturing apparatus A 301, apparatus B 302, and apparatus C 303 which can manufacture identical products.

For the apparatuses A 301 to C 303, the failure probability and/or failure rate is calculated for each of portions which constitute the apparatuses A 301 to C 303 by the same procedures as those in the first embodiment. Function information representing the failure probability and/or failure rate as a function of the lapsed time of use or the number of processed products as shown in FIG. 12 is output as a graph.

Figure 17:
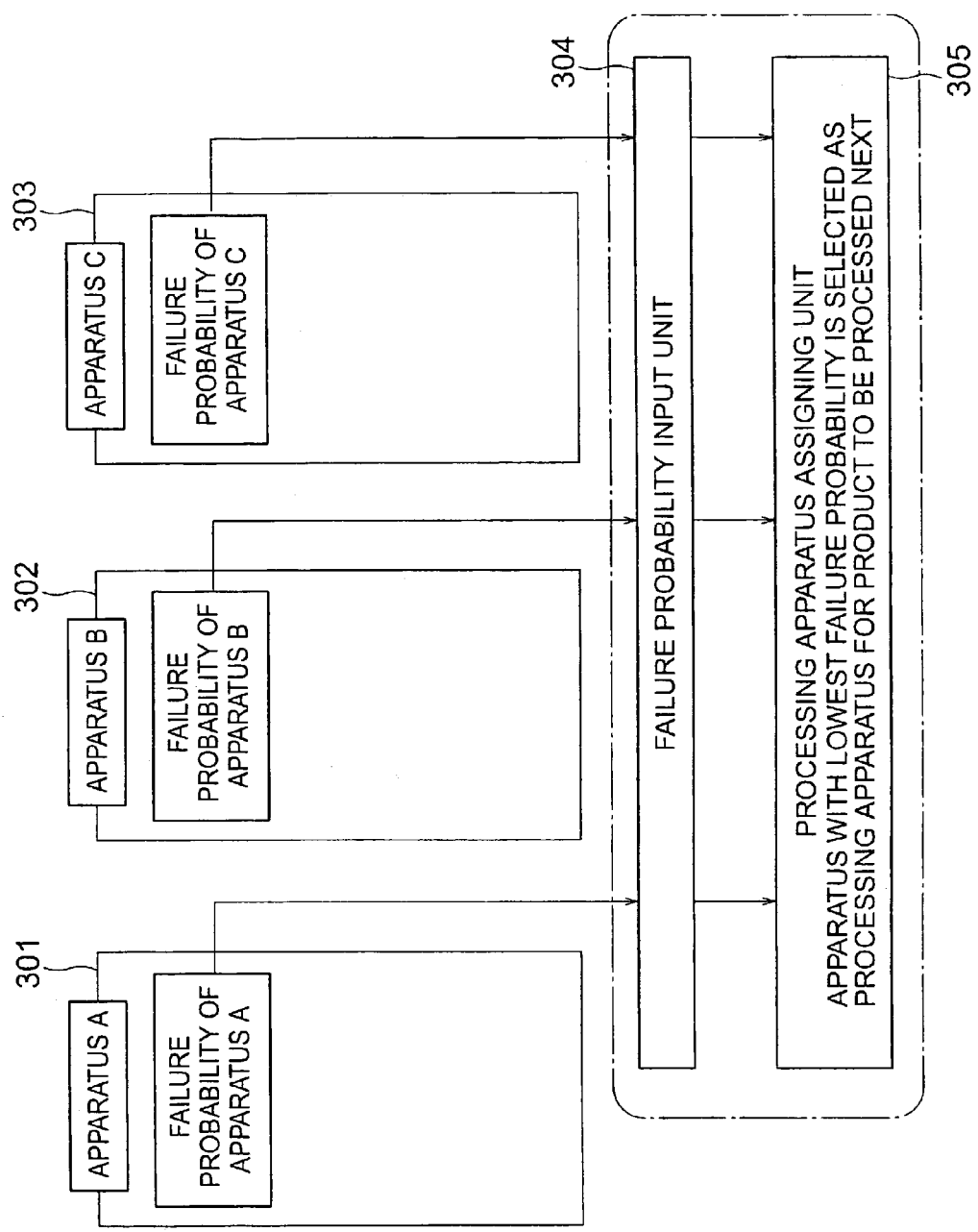
FIG. 17 is a block diagram showing the arrangement of a semiconductor manufacturing apparatus according to the fourth embodiment of the present invention.

As shown in FIG. 17, function information representing the failure probability and/or failure rate as a function of the lapsed time of use or the number of processed products is input to a failure probability input unit 304 for each of the apparatuses A 301, B 302, and C 303.

The input information is supplied to a processing apparatus assigning unit 305 which collects pieces of information representing the failure probabilities and/or failure rates of respective portions and calculates the failure probability and/or failure rate of each apparatus. After that, which of the manufacturing apparatuses is to be used is determined. More specifically, of the apparatuses A 301 to C 303, an apparatus having the lowest failure probability and/or failure rate is assigned as an apparatus to be used for the next processing.

The fourth embodiment allows processing a product by a manufacturing apparatus having the lowest failure occurrence probability. Occurrence of defectives and the extension of the manufacturing term due to a failure in the manufacturing apparatus during product processing can be reduced.

The maintenance & inspection plan of each apparatus is created by determining an order of apparatuses such that they are maintained and inspected from an apparatus having the highest failure probability and/or failure rate. Since apparatuses can be maintained and inspected from the one having a higher failure occurrence probability, the efficiency can increase.

(5) Fifth Embodiment

A component management method and apparatus according to the fifth embodiment of the present invention will be described.

Figure 18:
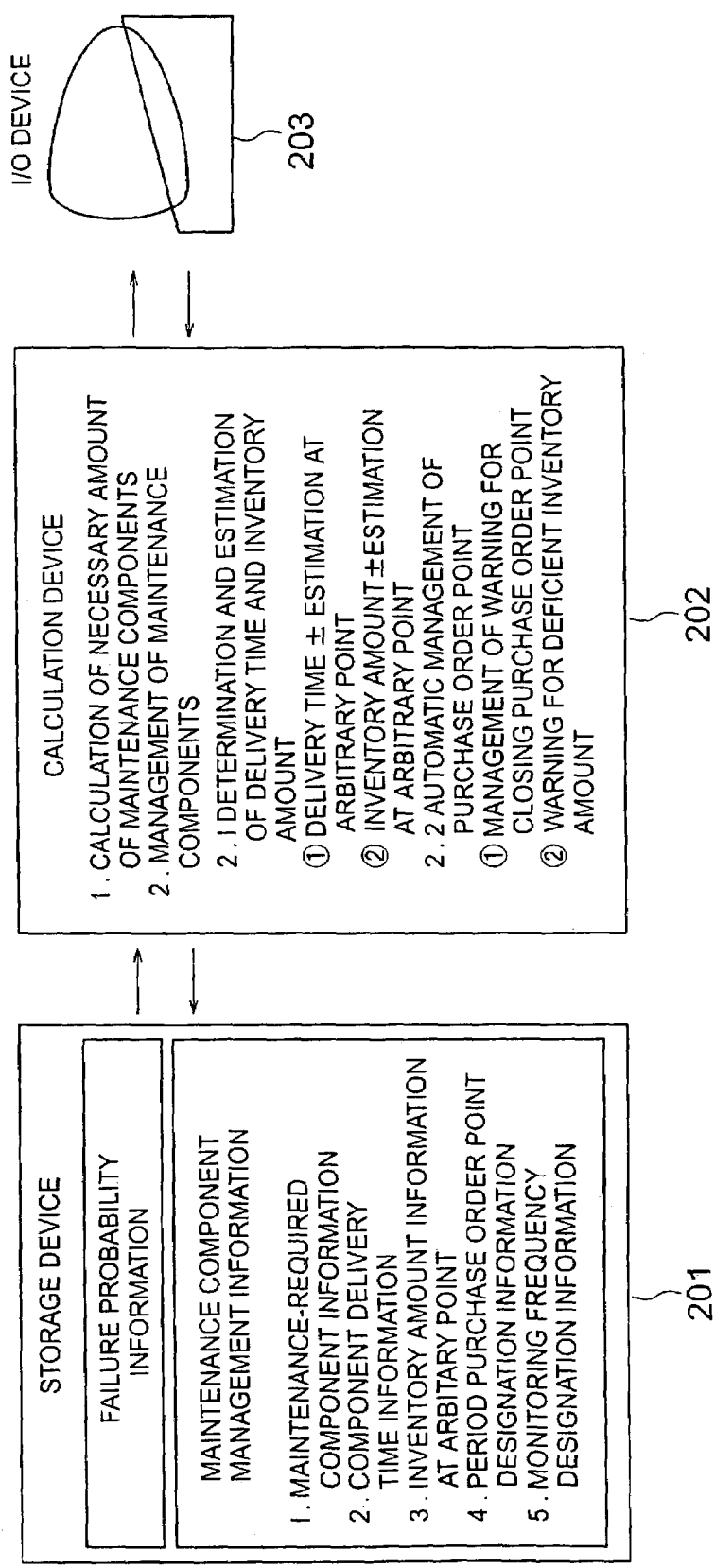
FIG. 18 is a block diagram showing the arrangement of a component management apparatus according to the fifth embodiment of the present invention.

As shown in FIG. 18, this apparatus comprises a storage device 201, calculation device 202, and I/O device 203. Various pieces of information (to be described later) input from the I/O device 203 are supplied to the storage device 201 and stored.

The pieces of information are supplied to the calculation device 202 and subjected to numerical processing, calculating a necessary amount of maintenance components, the delivery time, and the like. The calculation results are stored in the storage device 201, and also output from the I/O device 203.

Information can be desirably communicated via the I/O device 203 between the component management apparatus and a semiconductor manufacturing apparatus to be managed. The operator need not input/output data to/from the I/O device 203, and can communicate information at necessary time on request.

The information communication means is not particularly limited, and any means can be employed. As communication contents, information on the failure probability of each portion which constitutes the semiconductor manufacturing apparatus is transferred from the semiconductor manufacturing apparatus to the component management apparatus. The component management apparatus uses this information to perform calculation, and outputs the results.

By connecting the semiconductor manufacturing apparatus and the component management apparatus via the communication means, centralized management and remote management of a component can be achieved particularly in the presence of a plurality of semiconductor manufacturing apparatuses. Accurate component management can be easily done in a wider range, and the cost for information collection, calculation, and monitoring work can be greatly reduced.

The contents of processing using the component management apparatus will be explained.

Figure 19:
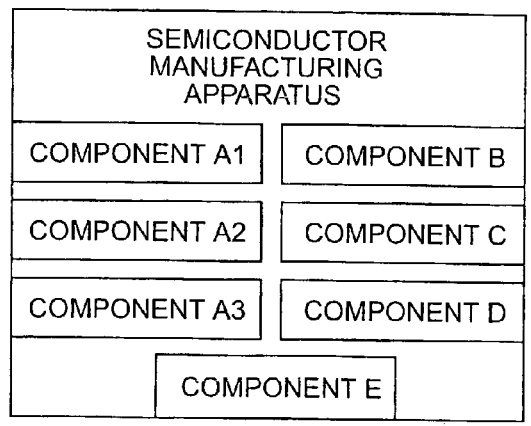
FIG. 19 is an explanatory view showing the arrangement of an apparatus having a plurality of identical components.

For example, the semiconductor manufacturing apparatus to be managed is made up of components A1, A2, A3, B, C, D, and E, as shown in FIG. 19. Of these components, components A1 to A3 are of the same type, and the respective components are numbered A1, A2, and A3.

Figure 20:
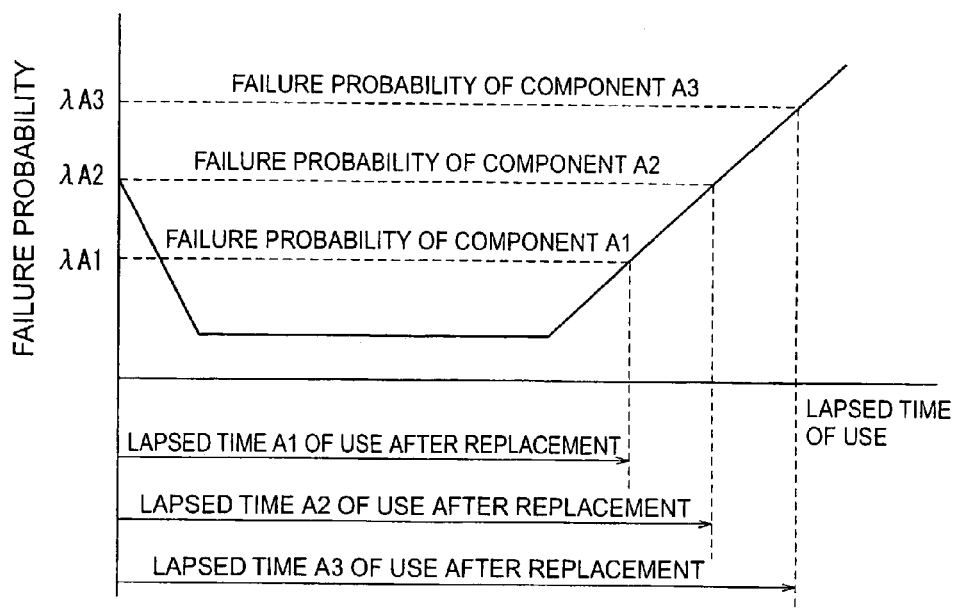
FIG. 20 is a graph showing the failure probability in the apparatus having a plurality of identical components.
Figures 21, 22:
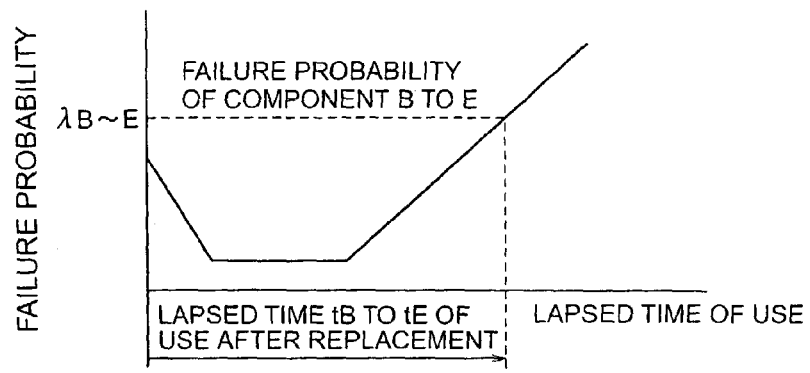
FIG. 21 is a graph showing the failure probability in an apparatus having one identical component.
FIG. 22 is an explanatory view showing a method of calculating a necessary amount of maintenance components according to the fifth embodiment.

In this case, function information which is obtained by numerical calculation processing using the same method as that in the first embodiment and represents the failure probability of a component as a function of the lapsed time of use after replacement or reproduction due to the failure of the component is illustrated in the graphs of FIGS. 20 and 21. Failure probabilities shown in FIG. 20 are the failure probabilities of components A1 to A3 of the same type. Failure probabilities shown in FIG. 21 are the failure probabilities of components B, C, D, and E, for each of which only one component of the same type exists. Similar to the graph of FIG. 12 described in the first embodiment, the graph shows a Weibull curve formed from three stages: an initial failure stage, accidental failure stage, and end-of-service-lifestage. The graph is used to predict the failure occurrence probability at an arbitrary lapsed time of use or an arbitrary number of processed products. In the fifth embodiment, the preparation amount of maintenance components is calculated using such information in accordance with the failure probability regardless of the experience and skills of the person in charge.

FIG. 22 shows an equation of calculating a necessary amount of maintenance components. For a plurality of components A, a total component amount $\lambda A1+\lambda A2+\lambda A3$ is required. For respective components B, C, D, and E, component amounts $\lambda B$, $\lambda C$, $\lambda D$, and $\lambda E$ are required. For the whole apparatus, the sum of these amounts is required.

Procedures of calculating a necessary amount of maintenance components will be explained in more detail.

Figure 23A:
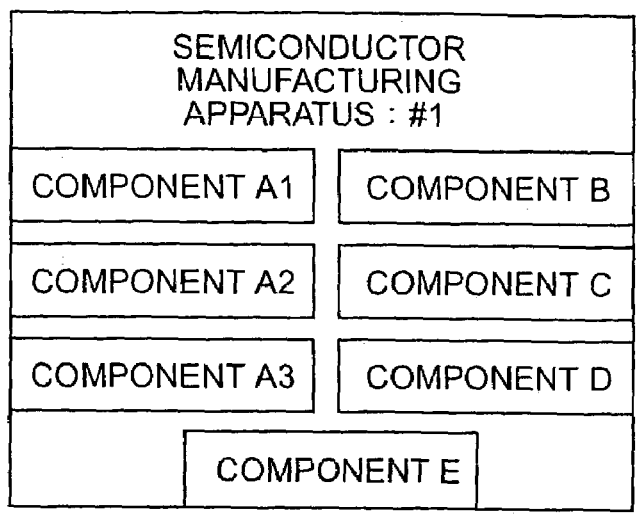
FIG. 23A is an explanatory view showing the arrangement of components in apparatus #1.
Figure 23B:
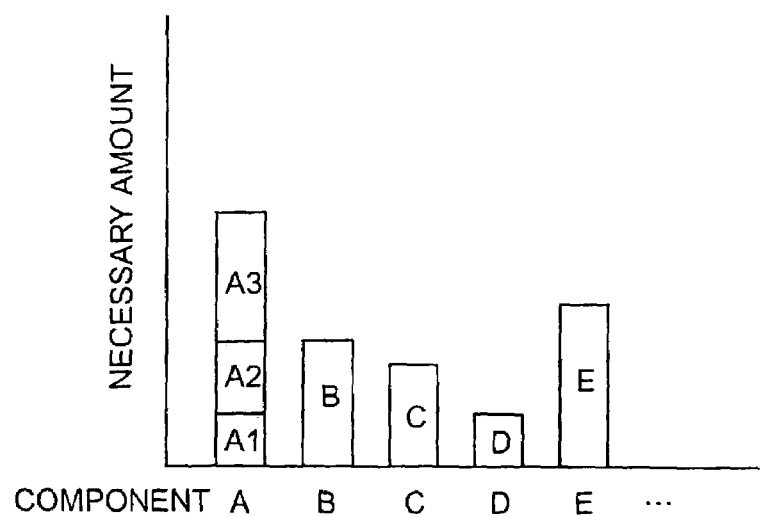
FIG. 23B is a graph showing a necessary amount of maintenance components as a function of an arbitrary lapsed time of use.

FIG. 23B shows the amount of maintenance components necessary at an arbitrary lapsed time of use that is calculated on the basis of pieces of function information representing the failure probabilities of building components A1 to A3, B, C, D, and E of apparatus #1 shown in FIG. 23A.

Figure 24A:
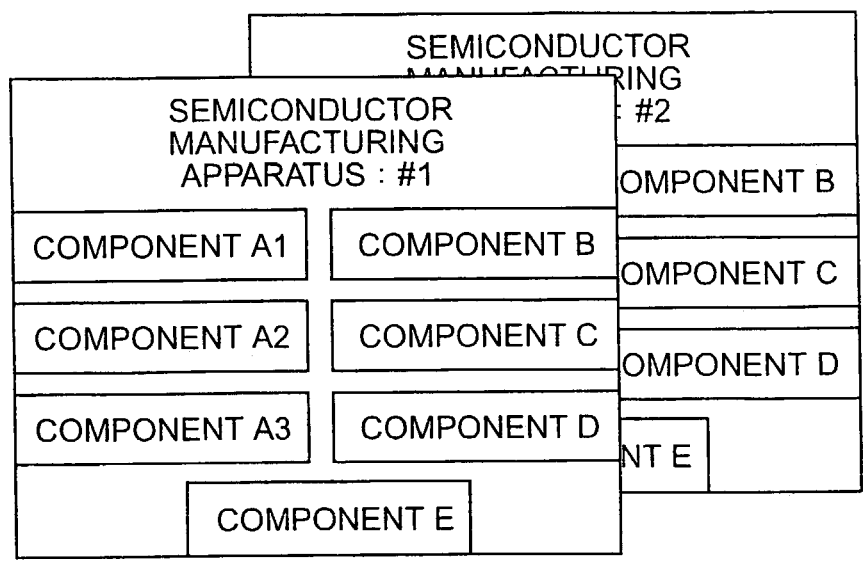
FIG. 24A is an explanatory view showing the arrangement of components in apparatuses #1 and #2.
Figure 24B:
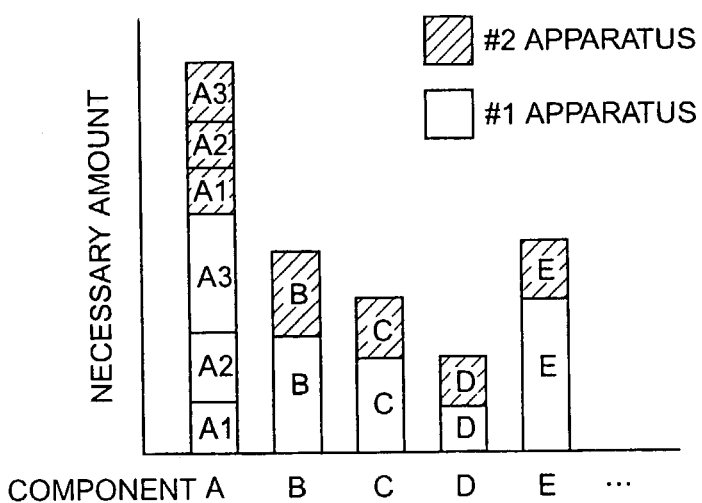
FIG. 24B is a graph showing a necessary amount of maintenance components as a function of an arbitrary lapsed time of use.

Similarly, FIG. 24B shows the amount of maintenance components necessary at an arbitrary lapsed time of use on the basis of pieces of failure probability information of building components A1 to A3, B, C, D, and E of apparatuses #1 and #2 shown in FIG. 24A.

Procedures of calculating a necessary amount of building components A in apparatus #1 shown in FIG. 23A will be described. In the presence of a plurality of identical components A, the failure probabilities $\lambda A1$ to $\lambda A3$ are different, as shown in FIG. 23B. This is because even identical components are different in the lapsed time of use after replacement or reproduction of each component. The failure probability is therefore different, and the necessary number of components is also different.

Considering the maintenance component inventory management system in the repair of a failure, it is efficient to perform inventory management of a component amount necessary at that time for all components in order to reduce the inventory amount and prevent occurrence of unavailable components. The necessary amount of maintenance components at an arbitrary point from the status of each component and all identical components is the total necessary amount of components on the basis of the sum of the failure probabilities of identical components. The total necessary amount of components is effectively managed as an inventory amount in the inventory management system.

When the number of target components is one, like components B to E with failure probabilities $\lambda B$ to $\lambda E$ shown in FIG. 24A, the sum of failure probabilities is determined by the failure probability of one component, and the amount of components necessary to maintain each component at an arbitrary point may be very small. To prevent unavailable components from occurring, less than one (1.00) component cannot be prepared for one component in inventory management. In demand for uneconomic inventory, a minimum of one component must be stocked. For this reason, management of a large number of identical components is economic.

Figure 25:
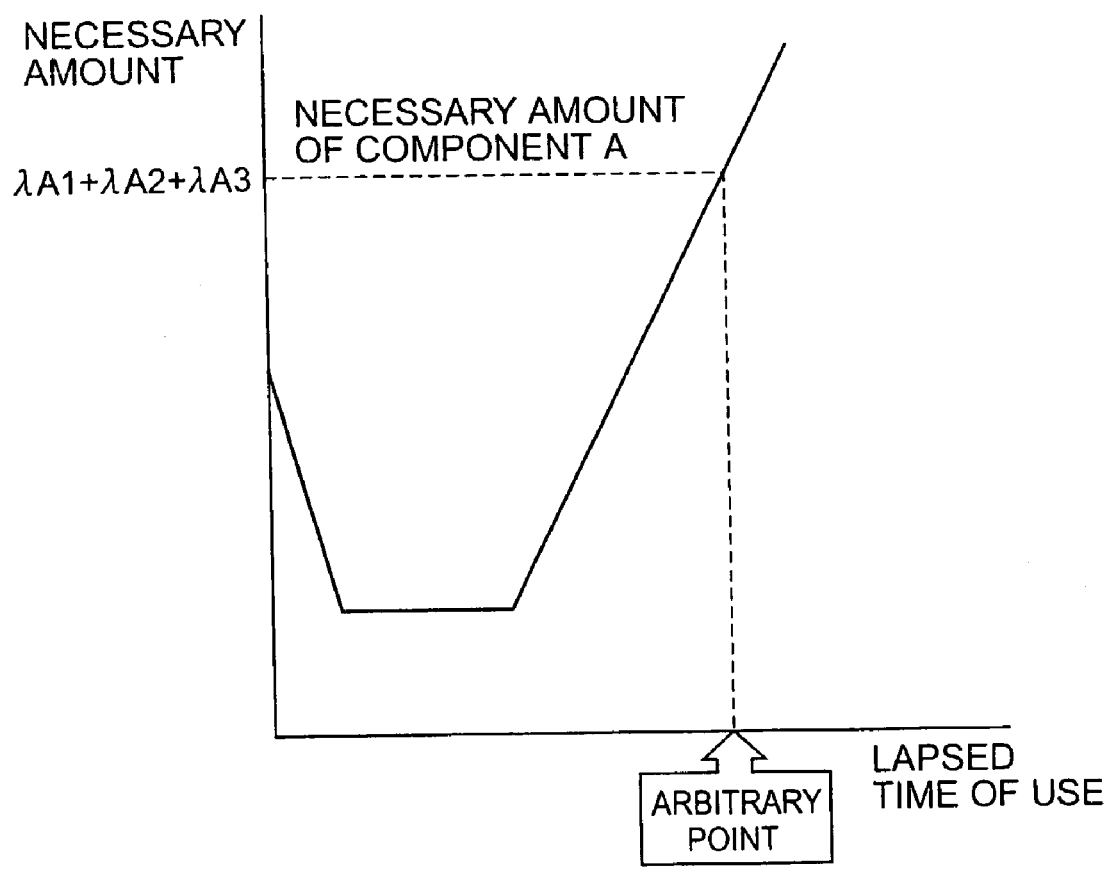
FIG. 25 is a graph showing a necessary amount of components A as a function of an arbitrary lapsed time of use in apparatuses #1 and #2.

The failure probability calculation procedures at an arbitrary point have been explained. The necessary amounts of components at a plurality of lapsed times of use are sequentially obtained and plotted as necessary amounts of components as a function of the lapsed time of use. The necessary amount of maintenance components A as a function of the lapsed time of use is shown in the graph of FIG. 25. By creating such a graph, a necessary amount at an arbitrary point can be easily calculated within a short time regardless of the experience and skills of a person in charge.

(6) Sixth Embodiment

A maintenance component management method and apparatus according to the sixth embodiment of the present invention concern a method of managing the inventory amount of maintenance components, the delivery time, the purchase order time, and the like by using information that is obtained according to the fifth embodiment and represents the necessary amount of maintenance components.

The main purpose of maintenance component management is inventory management of maintenance components. In the sixth embodiment, the necessary amount of maintenance components used to repair the failure of an apparatus, and the excess/deficiency of an amount to be prepared (stocked) in advance or the excess/deficiency of the delivery time in additional replenishment are calculated and diagnosed.

Figure 26:
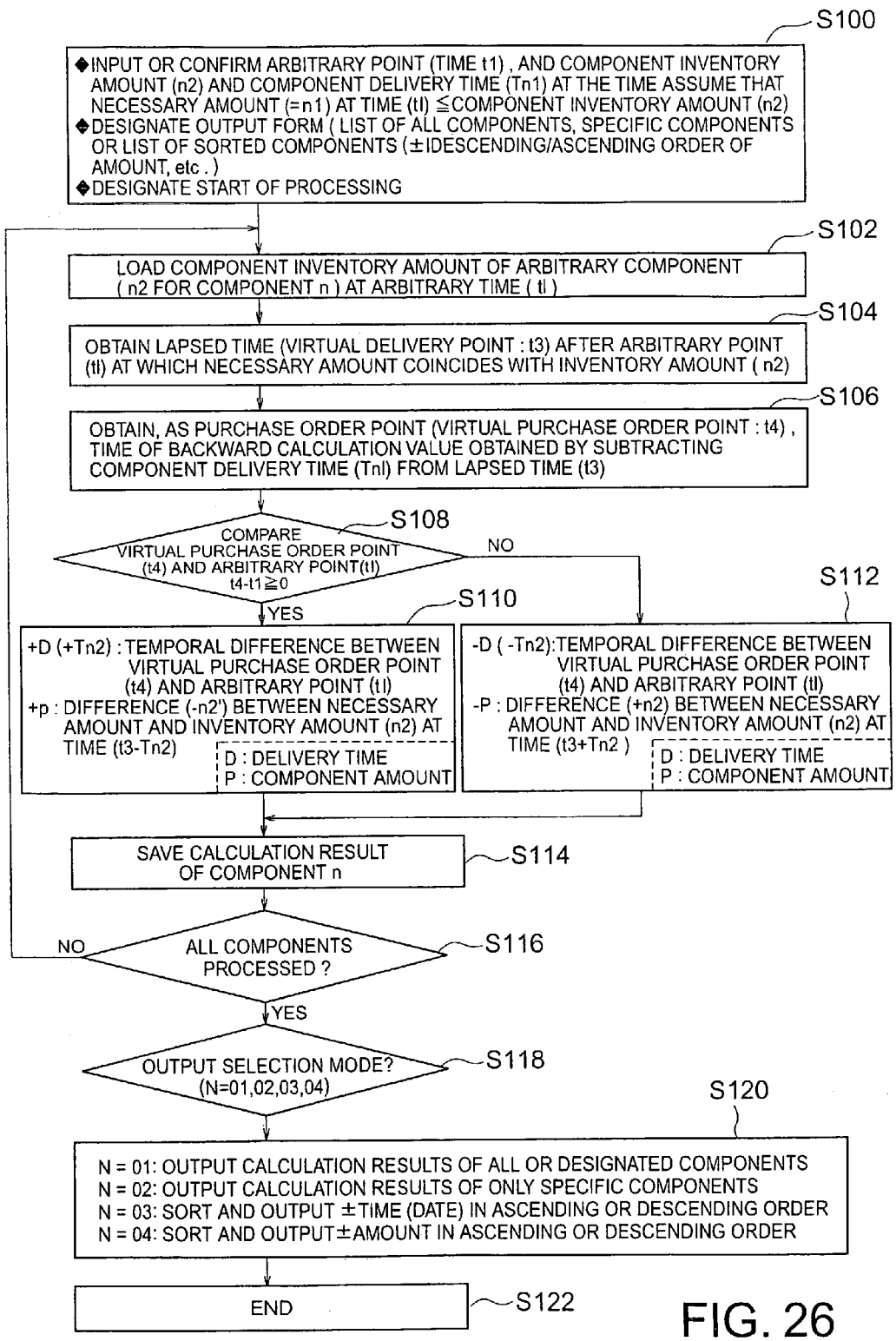
FIG. 26 is a flow chart showing procedures of confirming the inventory amount and delivery time according to the sixth embodiment of the present invention.
Figure 27:
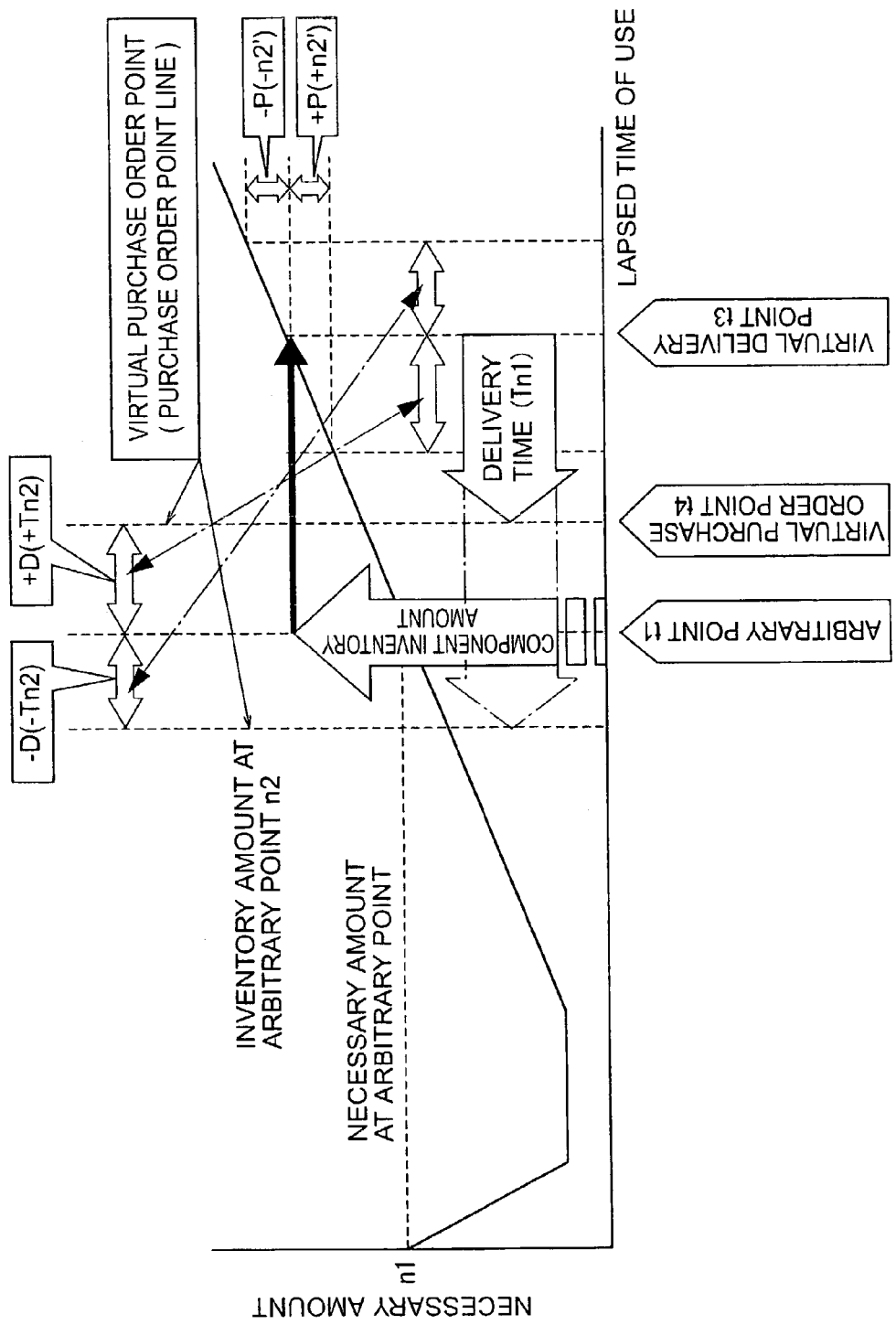
FIG. 27 is a graph schematically showing a method of determining the purchase order point of component n.

Procedures of confirming the inventory amount and delivery time according to the sixth embodiment are shown in the flow chart of FIG. 26. FIG. 27 shows a method of determining the purchase order point of component n. Calculation results obtained by the procedures of FIG. 26 are shown in FIG. 28 as an example of maintenance component management information data. Processing procedures according to the sixth embodiment will be explained with reference to FIGS. 26 to 28.

In step S100 of the flow chart of FIG. 26, a person in charge inputs time (t1) of an arbitrary point as purchase order time or confirmation time, inputs the inventory amount (n2) of each component which can be ensured at time t1 and a component delivery time (Tn1), or confirms existing data, and designates the start of processing.

In this case, a necessary amount n1 at time t1 is assumed to be equal to or smaller than the inventory amount n2 of components.

The person in charge further designates a data output form. The output form includes whether to display a list of all components, output only specific components, or output a list of components sorted in the order of amount.

In step S102, the person in charge inputs the inventory amount (n2 in FIG. 27) of a given component at the arbitrary point t1.

In step S104, a time at which the necessary amount n1 coincides with the inventory amount n2 is set as a virtual delivery point t3, and the lapsed time of use from the arbitrary point t1 to the virtual delivery point t3 is obtained.

In step S106, a point calculated by subtracting the delivery time Tn1 from the virtual delivery point t3 is set as a virtual purchase order point t4.

In step S108, the virtual purchase order point t4 is compared with the arbitrary point t1, and whether t4−t1≧0 is checked.

t4−t1≧0 means that there is still time till the delivery time, and the flow shifts to step S110.

t4−t1<0 means that there is no time till the delivery time, and the flow shifts to step S112.

In step S110 or S112, the excess/deficiency of the inventory amount from a necessary component amount at the virtual delivery point t3 when a purchase order is placed at the arbitrary point t1 is calculated. If a purchase order is placed at the arbitrary point t1, the excess/deficiency of the inventory amount until the component is additionally delivered is calculated by "±P".

In this way, a time by which the virtual purchase order point t4 deviates from the arbitrary point t1 is calculated as an excessive/deficient delivery time. That is, the time at which the necessary component amount and inventory amount coincide with each other is a time with an inventory margin "0". The delivery margin time of a virtual purchase order point which allows delivery of a component before this time is calculated by "±D (=t4−t1)".

In step S114, the calculation result is saved as a calculation result regarding component n. The same calculation is also done for other components. In step S116, whether all components have been processed is checked. If YES in step S116, an output selection mode is determined in step S118. As shown in step S120, the selection mode includes a mode (N=01) in which the calculation results of all or designated components are output, a mode (N=02) in which only the calculation results of specific components are output, a mode (N=03) in which ±times (dates) are sorted in ascending or descending order and output, and a mode (N=04) in which ±amounts are sorted in ascending or descending order and output. In step S122, the processing ends.

By calculation according to the above procedures, maintenance component management information as shown in FIG. 28 can be obtained.

Data representing the deficiency of the delivery time and inventory amount means to set the purchase order point earlier than an arbitrary point or to increase the inventory amount. To the contrary, data representing the excess of the delivery time and inventory amount means their margins.

With the component management information, purchase order point management considering the excess/deficiency of the component delivery time and determination of excess/deficiency management for maintenance component preparations can be reliably, easily performed regardless of the experience and skills of a person in charge.

As an improvement for facilitating work, ±times (±D), ±component amounts (±P), or the like in maintenance component management information data shown in FIG. 28 may be rearranged in descending or ascending order and output, as needed.

(7) Seventh Embodiment

In the seventh embodiment of the present invention, information for managing maintenance components is created by the same procedures as those in the sixth embodiment. In addition, (a) delivery time±estimation or (b) necessary inventory amount±estimation at an arbitrary point is always monitored at an arbitrary interval. Inventory amount/purchase order point management can be periodically, automatically monitored, and a warning can be output, as needed.

For example, an arbitrary inspection point is set as the prospective point of the next purchase order, and the delivery time (±DL) and necessary inventory amount (±PL) of each component are input.

An example of maintenance component management information shown in FIG. 29 is a list of data as calculation results before a warning is output. Pieces of predetermined input information, calculation results, and the like are listed up for each portion and component.

Figure 30:
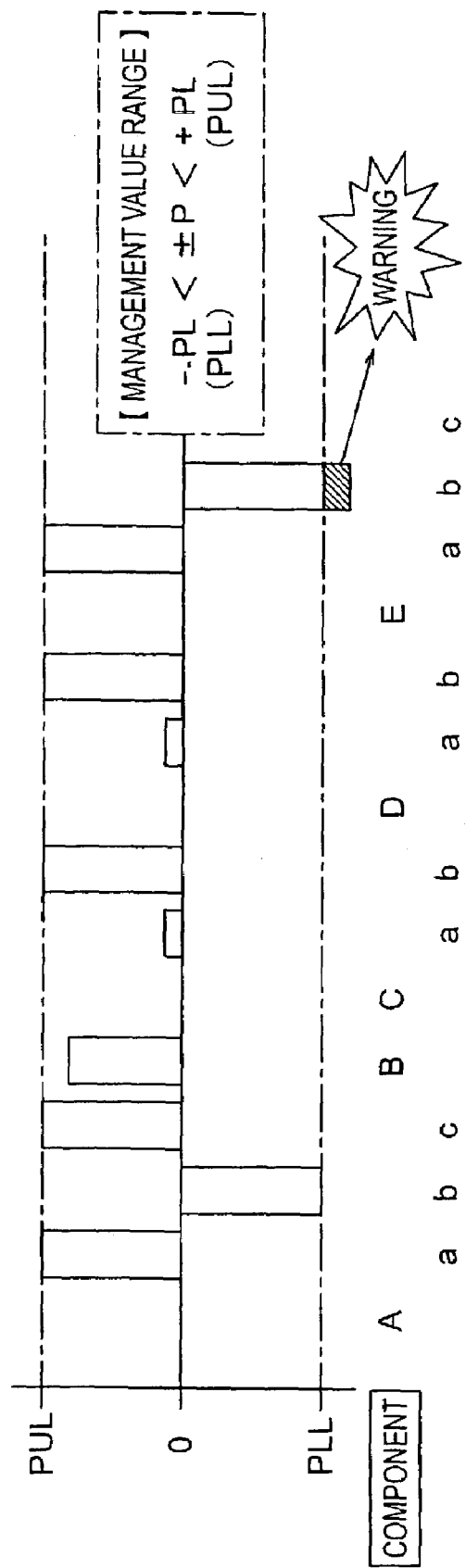
FIG. 30 is an explanatory view showing a method of managing the excess/deficiency of the maintenance component inventory amount.

As shown in FIG. 30, whether the calculation values of the delivery time (±D) and component amount (±P) fall within the range of management limit values (PUL and PLL) represented by chain lines in FIG. 30 is calculated and monitored. If each calculation value exceeds the management limit value (hatched portion), a warning is output, and if necessary, the calculation result of component information is output. The management limit value of the component amount ±P is given by −PL (PLL)<±P<+PL (PUL), and that of the delivery time (±D) is given by −DL<±D<+DL.

When the calculation values of the ±delivery time (±D) and ±component amount (±P) exceed the management limit value and a warning is to be output, data subjected to the warning is extracted, and the calculation result of component information is output, as shown in FIG. 31.

According to the seventh embodiment, a deficient amount of each type of maintenance components when a purchase order is placed at arbitrary time is grasped, and a warning can be output, as needed. Maintenance components can be easily managed regardless of the experience and skills of a person in charge.

As described above, according to the sixth and seventh embodiments, maintenance components can be prepared in accordance with the failure probability of each component and the number of components used. The accuracy of calculating a necessary amount of maintenance components is high, and the stock of excessive components can be reduced.

Since determination of a component amount necessary for maintenance is not influenced by any human factor such as individual skills of the operator or the like, a temporal loss due to an estimation error of the delivery time or amount can be eliminated. The necessary amount of maintenance components can be easily calculated without any skills.

The amount of maintenance components need not be calculated, decreasing the work amount.

The sixth embodiment realizes purchase order point management considering the excess/deficiency of the component delivery time, and excess/deficiency estimation management for maintenance component preparations. This simplifies the amount of maintenance components and work for delivery time/purchase order point management. Automatic excessive/deficient amount monitoring, warning, and excessive/deficient amount notification make it possible to avoid an unavailable maintenance component from occurring, greatly reduce the labor cost, and eliminate any human error.

(8) Eighth Embodiment

The eighth embodiment of the present invention will be described. The eighth embodiment intends to perform efficient processing by decreasing the maintenance execution count for a plurality of portions. The eighth embodiment adopts portions having the same service life after execution of maintenance, i.e., portions having the same time until the failure probability reaches a specific value after execution of maintenance.

Figure 32:
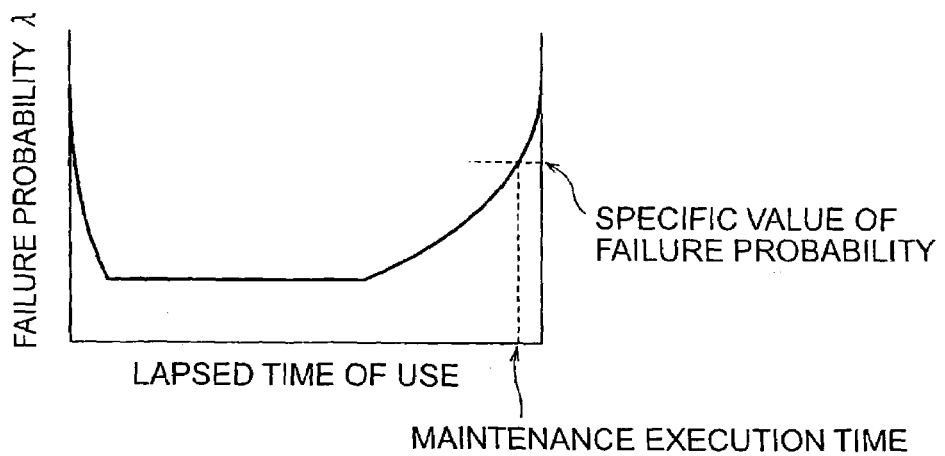
FIG. 32 is a graph showing a method of setting the specific value of the failure rate on a curve representing changes of the failure probability and obtaining the maintenance execution time according to the eighth and ninth embodiments of the present invention.

The graph of FIG. 32 shows a method of setting a specific value on a curve representing a change of the failure probability in this embodiment and the eighth embodiment to be described later, and obtaining the maintenance execution time. A curve representing a failure probability $\lambda$ as illustrated in the graph is obtained for each portion. The time after the lapsed time of use until the failure probability $\lambda$ reaches the specific value on the curve is determined as the maintenance execution time.

Similar to the first embodiment, a calculation device calculates the failure probability $\lambda$ for each portion.

Figure 33:
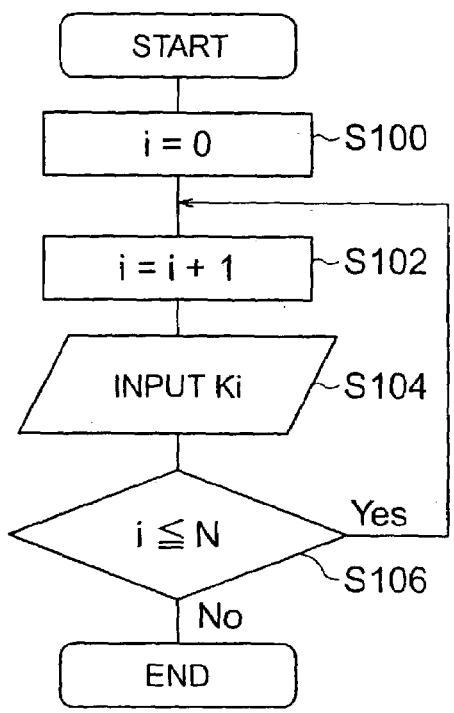
FIG. 33 is a flow chart showing procedures of setting a specific value for each portion according to the eighth embodiment of the present invention.

If a semiconductor manufacturing apparatus has N portions, as shown in the flow chart of FIG. 33, the worker sets an arbitrary specific value Ki (=K1 to KN) regarding the failure probability for each portion, and inputs the specific value Ki to a storage device, in steps S100 to S106.

Figure 34:
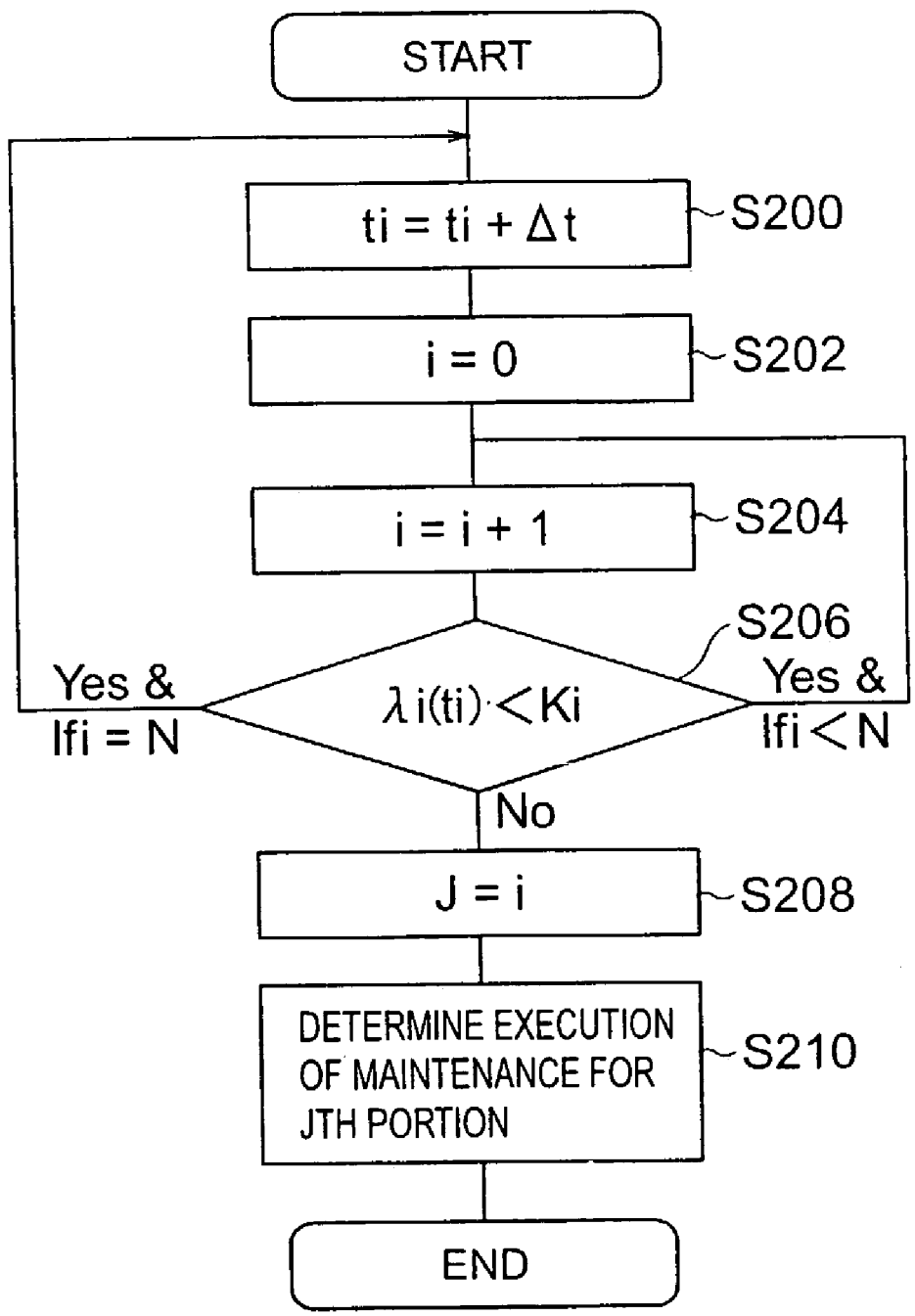
FIG. 34 is a flowchart showing procedures of determining the maintenance execution time according to the eighth embodiment.

In steps S200 to S210, as shown in the flow chart of FIG. 34, the failure probability $\lambda$i(ti) of the ith portion calculated by the calculation device is compared with a specific value Ki of the ith portion input to the storage device. In this case, $\lambda$i(ti) is the failure probability upon the lapse of an arbitrary time from the previous maintenance execution time, and $\Delta$t in step S200 is a predetermined time interval for calculating the failure probability.

The Jth portion whose failure probability $\lambda$i(ti) is equal to or higher than the specific value Ki is extracted, and maintenance is determined to be executed for this portion.

Figure 35:
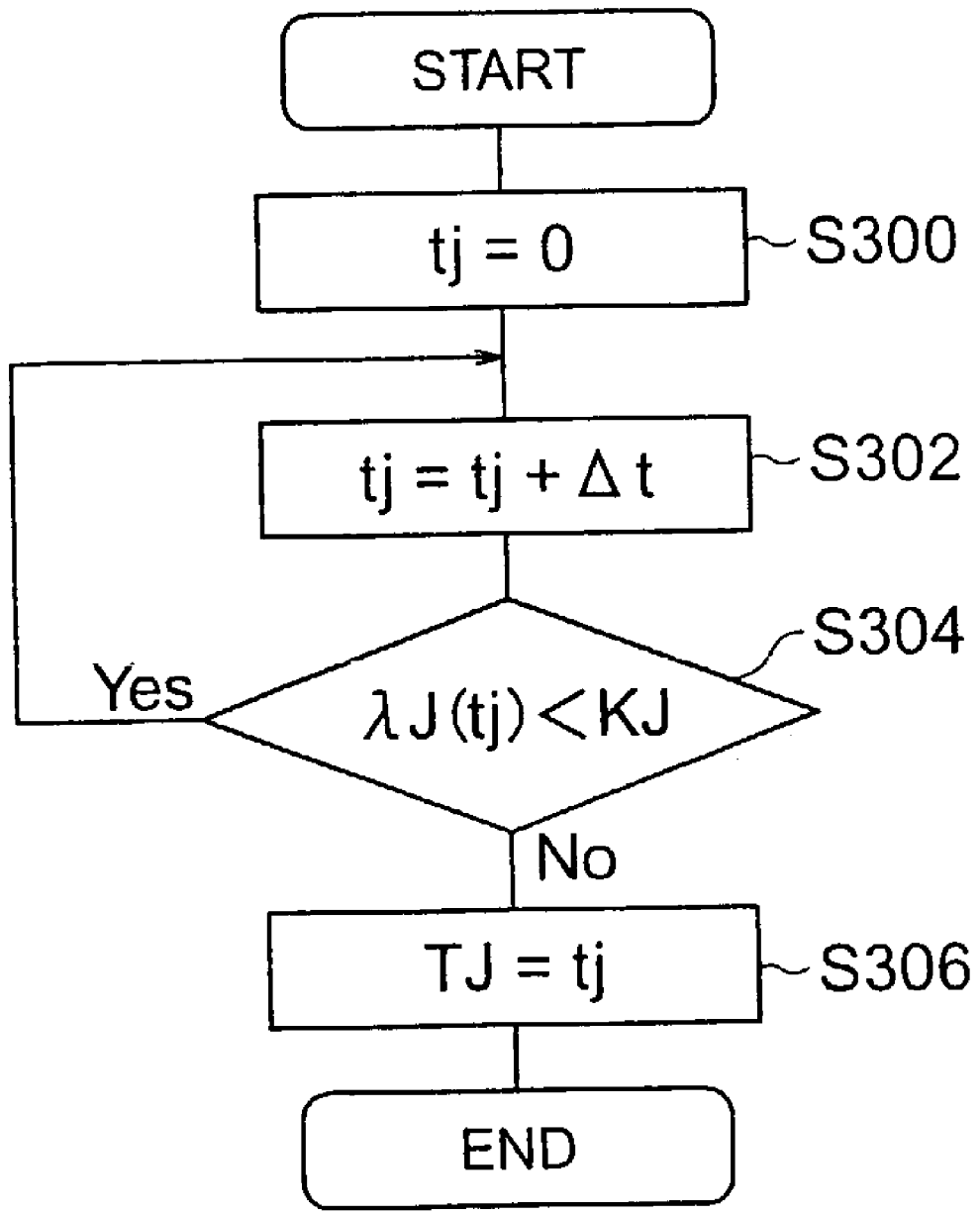
FIG. 35 is a flow chart showing procedures of obtaining a time until the next failure probability reaches the specific value after execution of maintenance at a portion determined to be maintained according to the eighth embodiment.

In steps S300 to S306, as shown in the flow chart of FIG. 35, the failure probability is added at the interval $\Delta$t from time tj at which maintenance is executed for the Jth portion determined to be maintained. A time TJ until the failure probability $\lambda$J(tj) reaches a specific value KJ is calculated.

Figure 36:
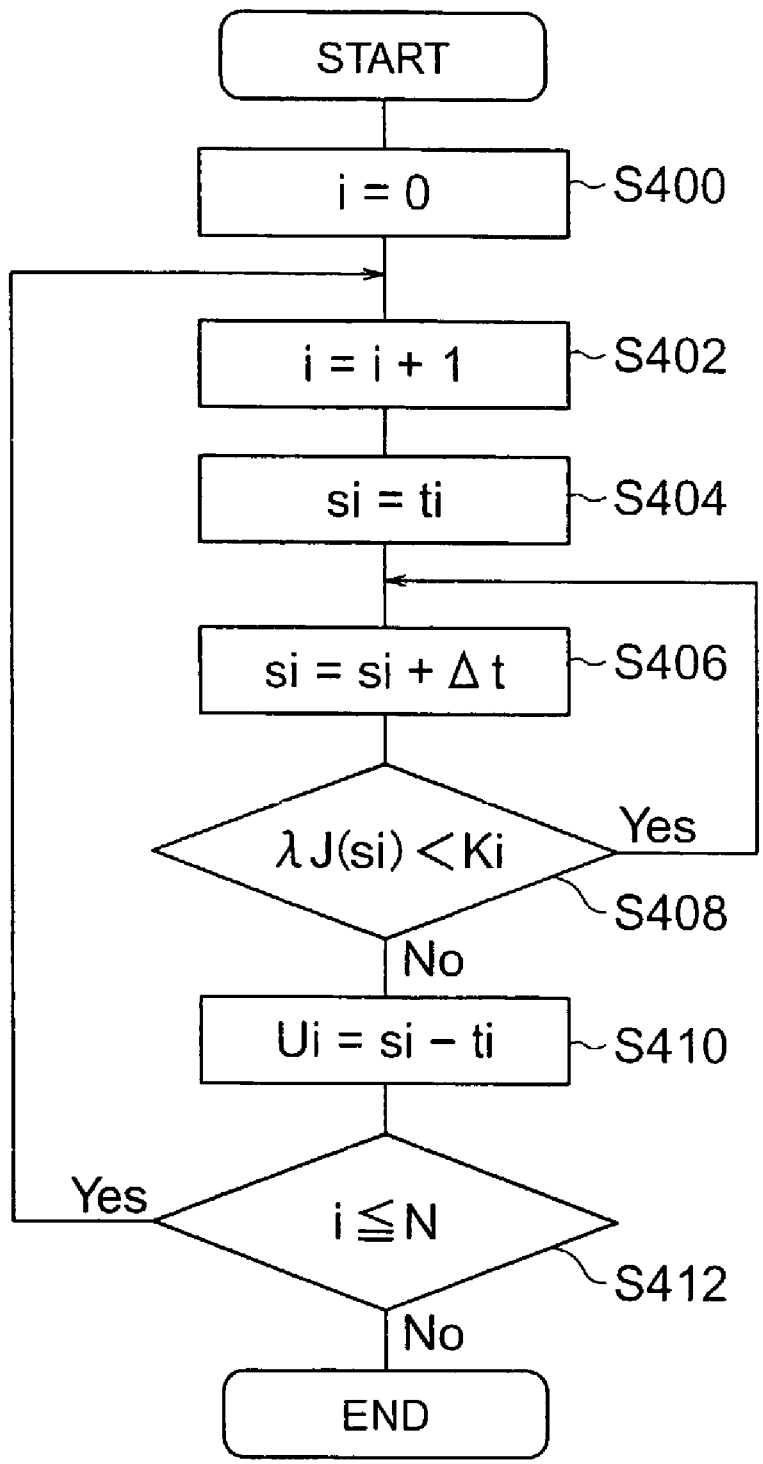
FIG. 36 is a flow chart showing procedures of obtaining the remaining time until the failure probability reaches the specific value next at a portion not determined to be maintained after execution of maintenance to another portion according to the eighth embodiment.

To the contrary, according to procedures shown in steps S400 to S412 in the flow chart of FIG. 36, the remaining lapsed time of use until the failure probability $\lambda$J(si) reaches the specific value Ki from the current time is obtained at the interval $\Delta$t for a portion not determined to be maintained in the flowchart of FIG. 34. Ui is the time until the failure probability of the ith portion reaches a specific value from the current time (ti).

Figure 37:
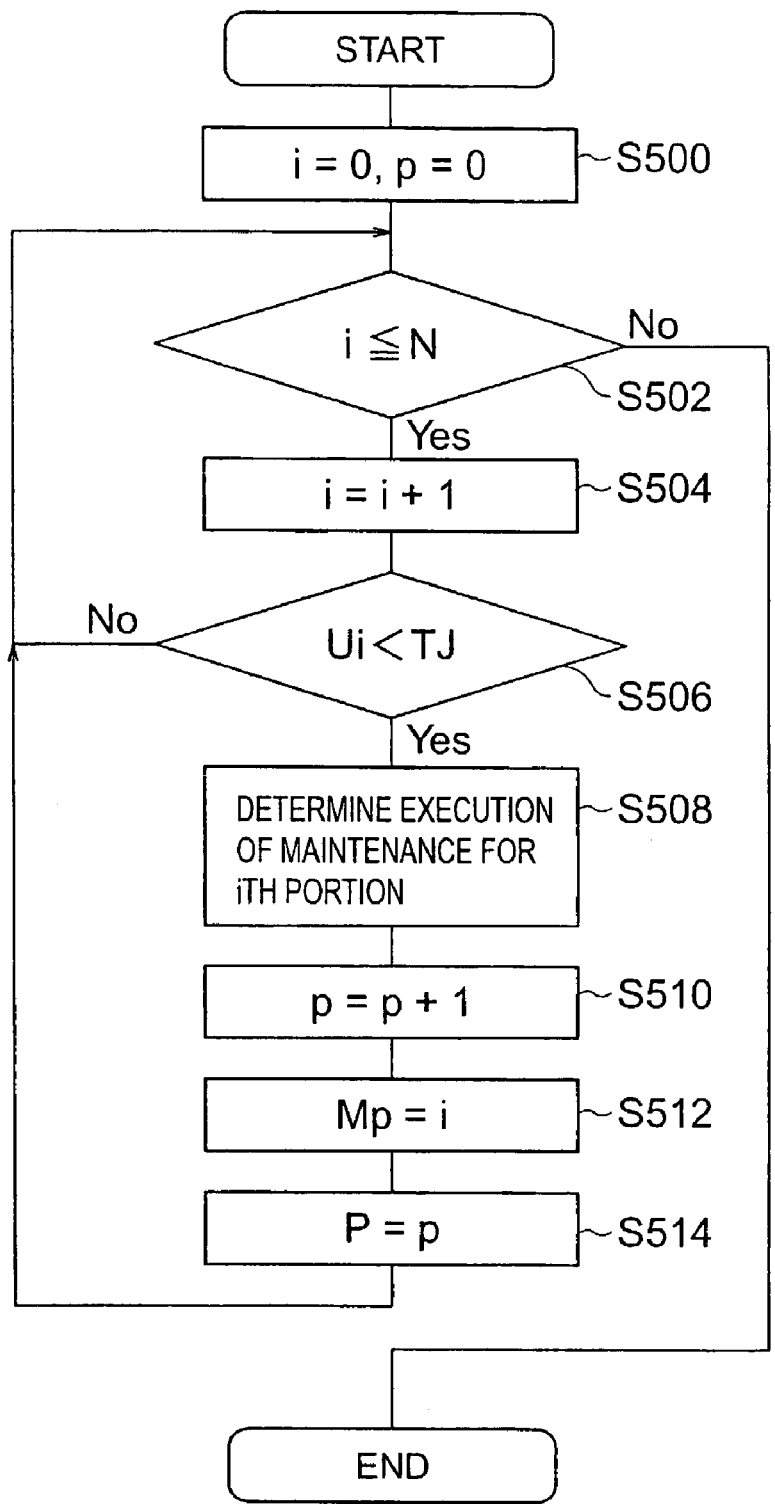
FIG. 37 is a flowchart showing procedures of determining a portion to be maintained according to the eighth embodiment.

The time TJ, obtained by the flowchart of FIG. 35, until the failure probability of the Jth portion determined to be maintained reaches the next specific value after execution of the maintenance, and the time TJ, obtained by the flow chart of FIG. 36, until the failure probability of the ith portion not determined to be maintained reaches a specific value after maintenance is executed for the Jth portion are compared in accordance with steps S500 to S514 in the flow chart of FIG. 37. In this case, the remaining time TJ of the ith portion is shorter, and the ith portion is determined to be a portion Mp subjected to execute the next maintenance.

Figure 38B:
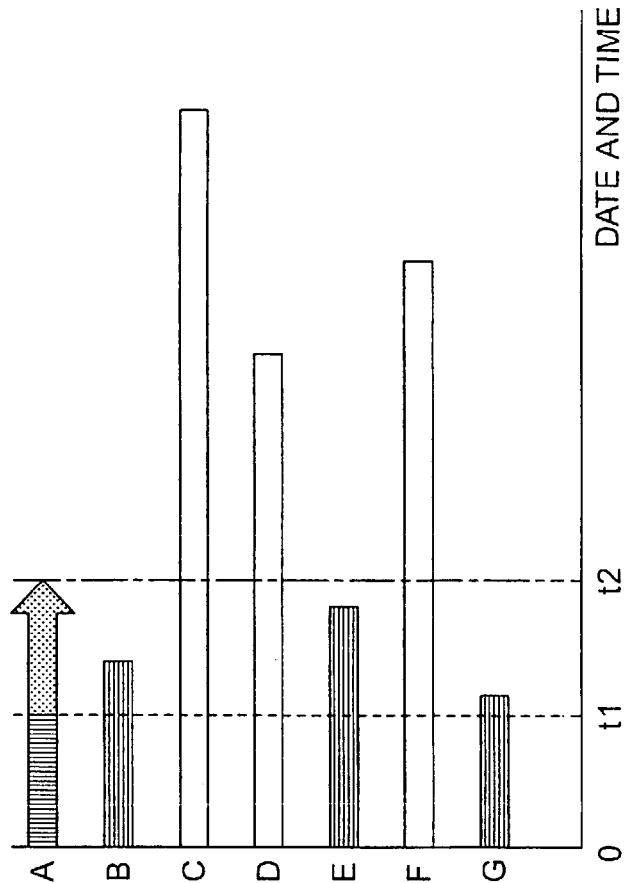
FIG. 38B is a graph showing a method of obtaining the maintenance execution time according to the eighth embodiment.
Figure 38A:
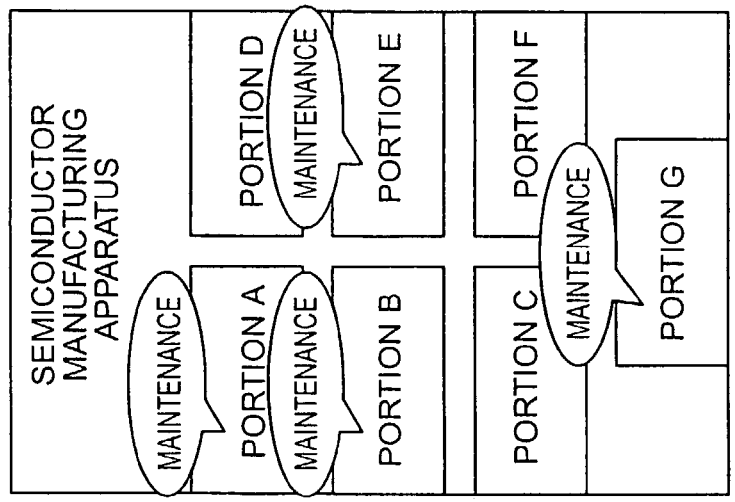
FIG. 38A is an explanatory view showing the arrangement of a portion.

Assume that the semiconductor manufacturing apparatus has portions A to G, as shown in FIG. 38A. In this case, maintenance for portions A, B, E, and G is done by determination complying with the above-described procedures.

More specifically, as shown in FIG. 38B, times until the failure probabilities of portions A to G reach a specific value after installation or execution of previous maintenance are set. Of all the portions, portion A has the shortest time until the failure probability reaches the specific value after time 0, and reaches the specific value at time t1. However, if only portion A is maintained at time t1, maintenance must be done for each portion, increasing the maintenance count and decreasing the efficiency. From this, maintenance is also executed at time t1 together with portion A for portions B, E, and G whose failure probabilities reach the specific value till time t2 at which the time until their failure probabilities reach the specific value is the shortest after maintenance of portion A at time t1, i.e., time t2 at which the next maintenance of portion A is executed.

By determining the maintenance time in this manner, portions whose failure probabilities are estimated high can be maintained at once. The failure probability of each portion can be reflected, the maintenance frequency can be decreased, and the efficiency can be increased.

(9) Ninth Embodiment

The ninth embodiment of the present invention will be described. Similar to the seventh embodiment, the ninth embodiment also intends to perform efficient processing by decreasing the maintenance execution count for a plurality of portions. However, the ninth embodiment is different from the seventh embodiment in the use of portions having different service lives after execution of maintenance for identical portions, i.e., portions having different times until the failure probability reaches a specific value after execution of maintenance.

Figure 39:
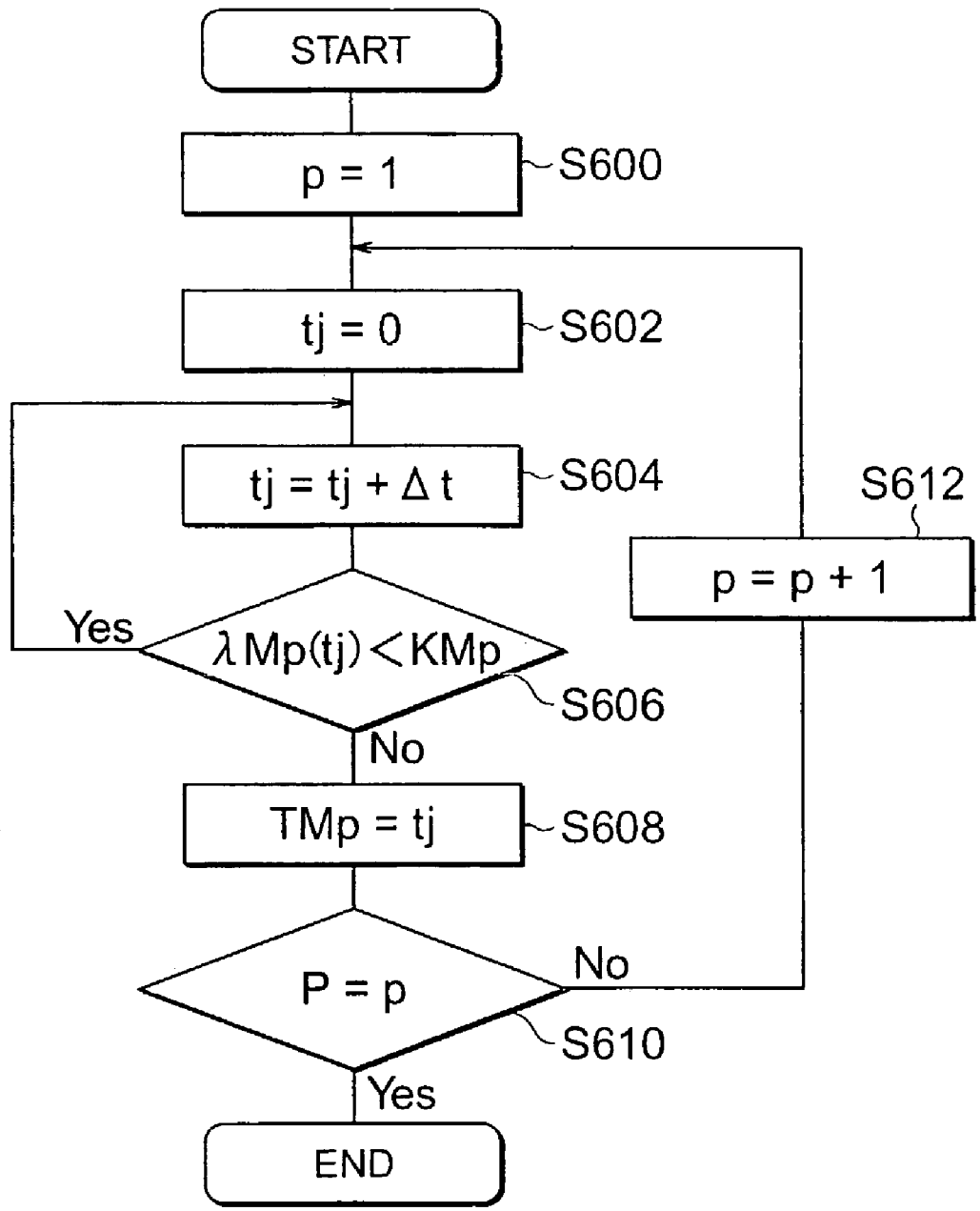
FIG. 39 is a flow chart showing procedures of obtaining a time until the failure probability reaches the specific value next at a portion not determined to be maintained after execution of maintenance to another portion according to the ninth embodiment of the present invention.

In steps S600 to S612 in the flow chart of FIG. 39, a time TMp until the failure probability reaches a specific value after time at which maintenance is assumed to be executed is obtained for portions temporarily determined to be maintained at once by the procedures described in the first embodiment with reference to FIG. 37.

Figure 40:
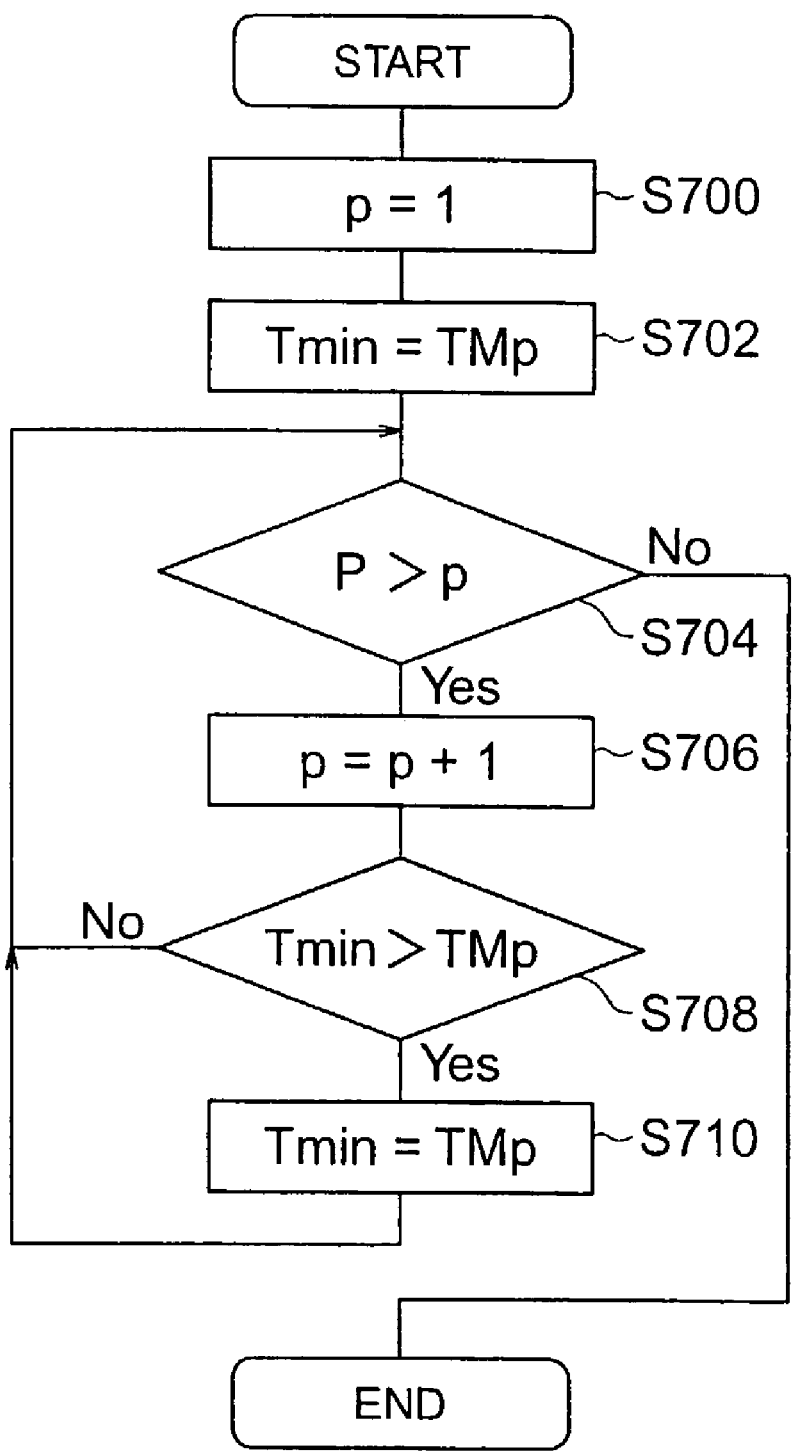
FIG. 40 is a flow chart showing procedures of obtaining a portion having a minimum time until the failure probability reaches the specific value next after execution of maintenance according to the ninth embodiment.

Of the lapsed times TMp of use obtained by the flow chart of FIG. 39 for respective portions, the minimum time Tmin is obtained in accordance with steps S700 to S710 in the flow chart of FIG. 40.

Figure 41:
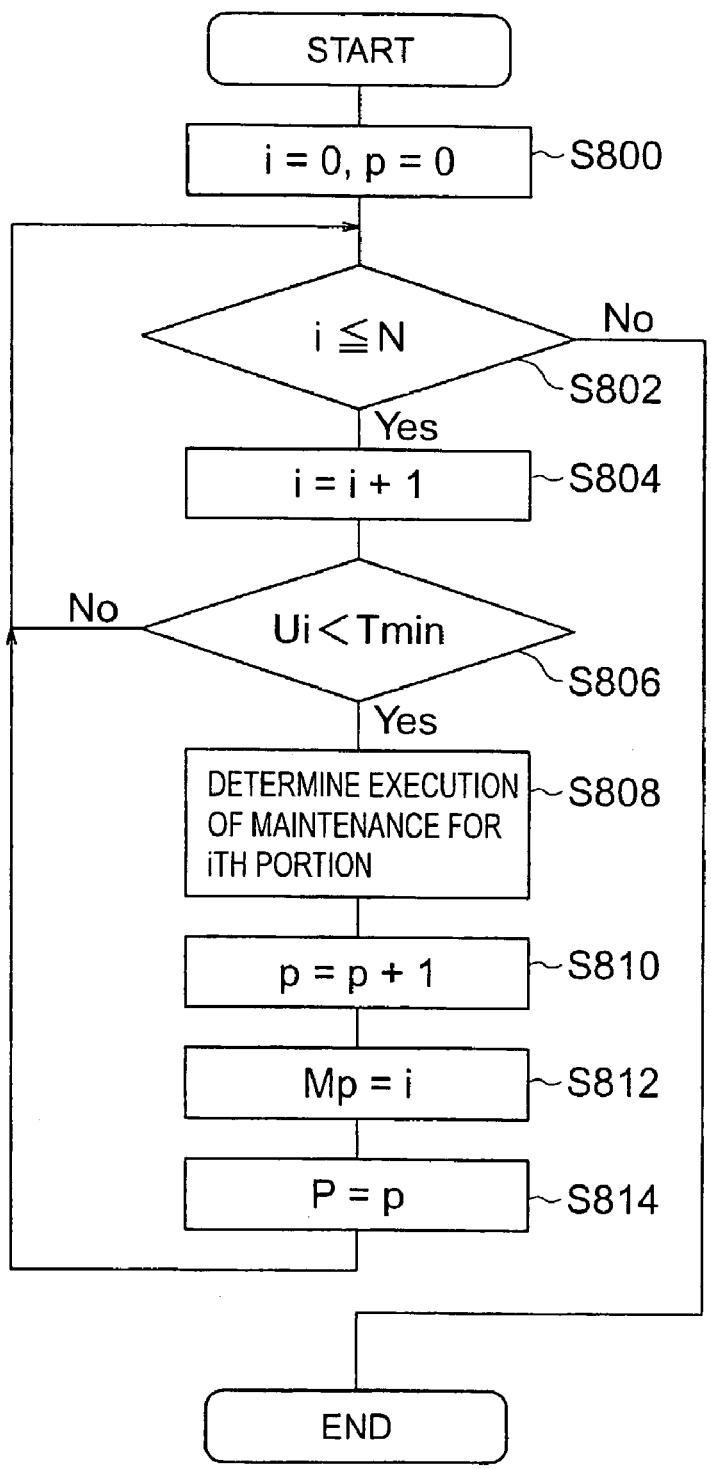
FIG. 41 is a flow chart showing procedures of finally determining a portion to be maintained according to the ninth embodiment.

The minimum lapsed time Tmin of use obtained by the flow chart of FIG. 40 and the remaining lapsed time Ui of use until the failure probability reaches the specific value at time at which each portion is assumed to be maintained are compared in accordance with steps S800 to S814 in the flow chart of FIG. 41.

In this case, Ui can be a value obtained by the flow chart of FIG. 37.

A portion having a latter value smaller than the former value is determined to be maintained.

Figure 42B:
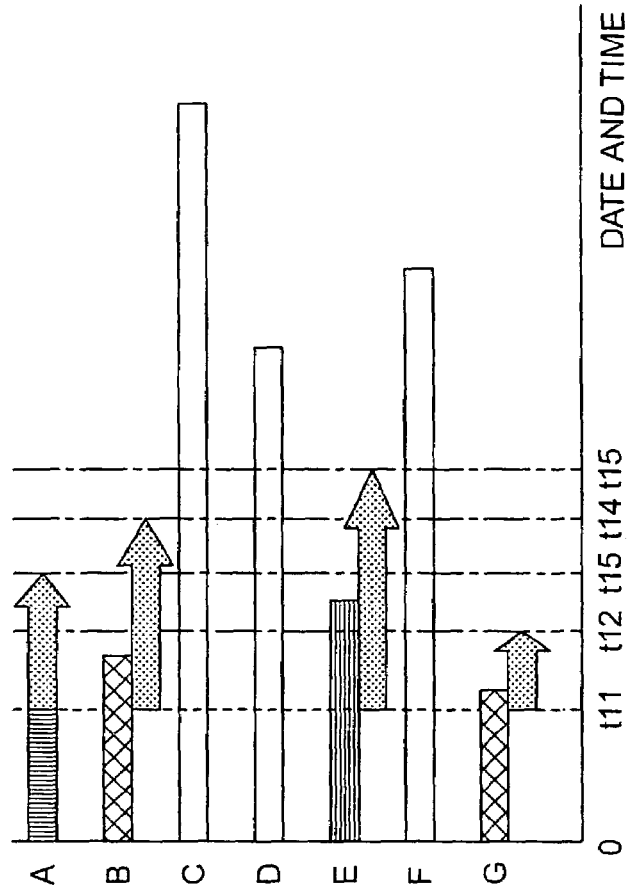
FIG. 42B is a graph showing a method of obtaining the maintenance execution time upon a change according to the ninth embodiment when the service life of a component changes.
Figure 42A:
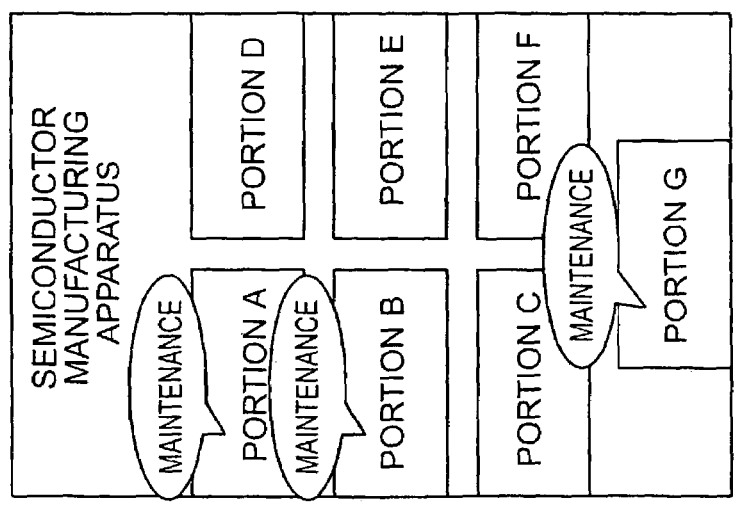
FIG. 42A is an explanatory view showing the arrangement of a portion.

Assume that the semiconductor manufacturing apparatus has portions A to G, as shown in FIG. 42A. In this case, portions A, B, and G are determined to be maintained in accordance with the above-described procedures.

As shown in FIG. 42B, times until the failure probabilities of portions A to G reach a specific value after installation or execution of previous maintenance are set. Of all the portions, portion A has the shortest time until the failure probability reaches the specific value after time 0, and reaches the specific value at time t11. By the same procedures as those in the first embodiment, maintenance is temporarily assumed to be executed for portions A, B, E, and G whose failure probabilities reach the specific value between time t11 and time t13 at which portion A undergoes the next maintenance. After portions A, B, E, and G are maintained at time t11, times t13, t14, t15, and t12 at which the failure probability reaches the specific value are obtained.

In the ninth embodiment, not portion A but portion G has the shortest time until the failure probability reaches the specific value after execution of maintenance at time t11. This is because portion G is longer in service life than portion A before replacement but replaced portion G becomes shorter in service life than portion A due to a change of product specifications or the like. The failure probability of portion G reaches the specific value at time t12.

Portions whose failure probabilities reach the specific value between time t11 and time t12 are portions A, B, and G. Hence, portions A, B, and G are maintained together at time t11.

The ninth embodiment realizes maintenance which reflects the failure probability of each portion even when the failure probability changes due to, e.g., the difference in specifications between a replaced component and a component before replacement. The maintenance frequency can be decreased, increasing the efficiency. In the example shown in FIGS. 42A and 42B, execution of maintenance is determined unnecessary for portion E, increasing the work efficiency.

The above-described embodiments are merely examples, and do not limit the present invention. For example, the semiconductor wafer storage vessel transport apparatus has been described as an example of the semiconductor manufacturing apparatus, but the present invention can also be applied to another semiconductor manufacturing apparatus.

As has been described above, the semiconductor manufacturing apparatus or semiconductor manufacturing apparatus management apparatus according to the above-described embodiments can contribute to specifying a faulty portion or a portion to be maintained upon occurrence of a failure at each portion which constitutes a semiconductor manufacturing apparatus. Pieces of progress information till a failure at each portion within the apparatus are accumulated and processed, and the failure probability and/or failure rate of each portion is obtained, supporting failure cause inspection, preventive maintenance, and inventory management of a portion.

The semiconductor wafer storage vessel transport apparatus according to the above-described embodiments can accurately specify a faulty portion. The failure probability of a portion of the transport vehicle can be grasped, supporting failure cause inspection.

In the presence of a plurality of semiconductor manufacturing apparatuses capable of the same processing, the semiconductor manufacturing apparatus management apparatus according to the above-described embodiments can accurately determine which of the apparatuses is to be used, and prevent defective products or a long manufacturing term. That is, a product can be processed by a semiconductor manufacturing apparatus having a low failure probability, and occurrence of defectives and the extension of the manufacturing term due to a failure in the manufacturing apparatus during product processing can be prevented.

The semiconductor manufacturing apparatus according to the above-described embodiments can enhance the necessity to prepare maintenance components in accordance with components having high failure probabilities and frequently used components, and increase the precision of maintenance components to be prepared. Unavailable components can be prevented from occurring upon generation of a failure, and the stock of excessive components can be reduced.

The semiconductor manufacturing apparatus according to the above-described embodiments can increase the efficiency by maintenance which reflects the failure probability of each portion. In other words, necessary components and their necessary amounts can be accurately, easily determined regardless of the skills of a person in charge, suppressing generation of missing components and the excessive inventory.

What is claimed is:

1. A semiconductor manufacturing apparatus having a plurality of portions, comprising:
    a storage device which stores, for each portion of the semiconductor manufacturing apparatus, information representing a lapsed time of use or a product processing count till occurrence of a failure after installation of the portion of the semiconductor manufacturing apparatus; and
    a calculation device which receives the information stored in said storage device and outputs function information representing a failure probability and/or a failure rate of each portion of the semiconductor manufacturing apparatus as a function of the lapsed time of use or the product processing count for each portion.

2. An apparatus according to claim 1, wherein said calculation device divides at a predetermined interval the lapsed time of use or the product processing count till occurrence of a failure after installation of the portion that is represented by the information for each portion, and collects for every interval a number of faulty portions in each interval.

3. An apparatus according to claim 2, wherein said calculation device outputs, as failure probability change information along with progress of the lapsed time of use or the product processing count for each portion, a quotient for each interval calculated by dividing the number of faulty portions in each interval obtained by collection every interval by a number of portions free from any failure in the interval.

4. An apparatus according to claim 2, wherein said calculation device calculates a quotient for each interval by dividing the number of faulty portions in each interval obtained by collection every interval by the number of portions free from any failure in the interval and a duration of each interval or a product processing count width, and outputs the quotient as failure rate change information along with progress of the lapsed time of use or the product processing count for each portion.

5. An apparatus according to claim 1, wherein said calculation device generates and outputs information in which the portions are arranged in descending order of failure occurrence probability by using the function information representing the failure probability and/or failure rate as a function of the lapsed time of use or the product processing count obtained for each portion.

* * * * *